United States Patent
Straube et al.

(10) Patent No.: US 7,814,499 B2
(45) Date of Patent: *Oct. 12, 2010

(54) URGENT REPLICATION FACILITY

(75) Inventors: Dave D. Straube, Redmond, WA (US); Aaron M. Contorer, Kirkland, WA (US); Arnold S. Miller, Bellevue, WA (US); Balan S. Raman, Redmond, WA (US); Pradyumna K. Misra, Issaquah, WA (US); Michael R. C. Seaman, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 408 days.

This patent is subject to a terminal disclaimer.

(21) Appl. No.: 11/275,116

(22) Filed: Dec. 12, 2005

(65) Prior Publication Data

US 2006/0136484 A1    Jun. 22, 2006

Related U.S. Application Data

(63) Continuation of application No. 10/154,014, filed on May 23, 2002, now Pat. No. 7,200,847, which is a continuation of application No. 08/673,929, filed on Jul. 1, 1996, now Pat. No. 6,412,017.

(51) Int. Cl.
  *G06F 9/44* (2006.01)
(52) U.S. Cl. .................. 719/313; 717/170
(58) Field of Classification Search .......... 719/310, 719/313, 314, 315, 328; 707/1, 10, 8, 201–203; 709/202, 224; 718/107, 108; 717/170
  See application file for complete search history.

(56) References Cited

U.S. PATENT DOCUMENTS

| 4,432,057 A | 2/1984 | Daniell et al. |
| 4,620,276 A | 10/1986 | Daniell et al. |
| 4,714,995 A | 12/1987 | Materna et al. |
| 4,714,996 A | 12/1987 | Gladney et al. |

(Continued)

FOREIGN PATENT DOCUMENTS

EP    0278472    8/1988

(Continued)

OTHER PUBLICATIONS

Popek et al "Replication in Ficus Distributed File Systems", 1990 IEEE, pp. 5-10.*

(Continued)

*Primary Examiner*—Van H Nguyen
(74) *Attorney, Agent, or Firm*—Merchant & Gould PC

(57) ABSTRACT

A system and method for expediting the replication of at least one specified object to a replica in a distributed computer system. A source object of a source replica determines that it has an urgent change to propagate through the distributed system, and informs a replication facility at the source replica of the urgent change. The facility extracts, or is provided with, the change information from that object, and the source replica communicates information representative of the change to a destination replica. A replication facility at the destination replica provides the change information to a destination replica object, which uses the information to make itself consistent with the source replica object.

2 Claims, 8 Drawing Sheets

U.S. PATENT DOCUMENTS

| | | |
|---|---|---|
| 4,809,170 A | 2/1989 | Leblang et al. |
| 4,853,843 A | 8/1989 | Ecklund |
| 4,873,517 A | 10/1989 | Baratz et al. |
| 4,875,159 A | 10/1989 | Cary et al. |
| 4,887,204 A | 12/1989 | Johnson et al. |
| 4,888,681 A | 12/1989 | Barnes et al. |
| 4,954,941 A | 9/1990 | Redman |
| 5,001,628 A | 3/1991 | Johnson et al. |
| 5,032,979 A | 7/1991 | Hecht et al. |
| 5,052,040 A | 9/1991 | Preston et al. |
| 5,109,486 A | 4/1992 | Seymour |
| 5,113,519 A | 5/1992 | Johnson et al. |
| 5,133,075 A | 7/1992 | Risch |
| 5,151,989 A | 9/1992 | Johnson et al. |
| 5,155,847 A | 10/1992 | Kirouac |
| 5,170,480 A * | 12/1992 | Mohan et al. ............... 707/201 |
| 5,202,971 A | 4/1993 | Henson et al. |
| 5,212,789 A * | 5/1993 | Rago ............................ 707/8 |
| 5,214,776 A | 5/1993 | Bagnoli et al. |
| 5,222,217 A | 6/1993 | Blount et al. |
| 5,247,673 A | 9/1993 | Costa |
| 5,261,051 A | 11/1993 | Masden et al. |
| 5,261,094 A | 11/1993 | Everson et al. |
| 5,274,789 A | 12/1993 | Costa et al. |
| 5,278,979 A | 1/1994 | Foster et al. |
| 5,285,528 A | 2/1994 | Hart |
| 5,287,453 A | 2/1994 | Roberts |
| 5,307,481 A | 4/1994 | Shimazaki et al. |
| 5,313,630 A | 5/1994 | Namioka et al. |
| 5,313,646 A | 5/1994 | Hendricks et al. |
| 5,333,265 A | 7/1994 | Orimo et al. |
| 5,333,310 A | 7/1994 | Sakai |
| 5,333,317 A | 7/1994 | Dann |
| 5,377,323 A | 12/1994 | Vasudevan |
| 5,388,255 A | 2/1995 | Pytlik |
| 5,403,639 A * | 4/1995 | Belsan et al. ............... 707/204 |
| 5,408,619 A * | 4/1995 | Oran ........................... 707/10 |
| 5,410,691 A | 4/1995 | Taylor |
| 5,414,812 A | 5/1995 | Filip et al. |
| 5,423,037 A | 6/1995 | Hvasshovd |
| 5,434,974 A | 7/1995 | Loucks et al. |
| 5,434,994 A * | 7/1995 | Shaheen et al. ............. 709/223 |
| 5,440,744 A | 8/1995 | Jacobson et al. |
| 5,446,902 A | 8/1995 | Islam |
| 5,452,448 A | 9/1995 | Sakuraba |
| 5,463,774 A | 10/1995 | Jenness |
| 5,471,629 A | 11/1995 | Risch |
| 5,501,053 A | 3/1996 | Goleby |
| 5,504,906 A | 4/1996 | Lutoff |
| 5,551,027 A | 8/1996 | Choy et al. |
| 5,551,034 A | 8/1996 | Herz |
| 5,553,279 A | 9/1996 | Goldring |
| 5,555,404 A * | 9/1996 | Torbjørnsen et al. ........ 707/202 |
| 5,586,310 A | 12/1996 | Sharman |
| 5,588,147 A | 12/1996 | Neeman |
| 5,590,318 A * | 12/1996 | Zbikowski et al. .......... 707/202 |
| 5,600,834 A | 2/1997 | Howard |
| 5,608,903 A | 3/1997 | Prasad et al. |
| 5,613,079 A | 3/1997 | Debique |
| 5,630,116 A | 5/1997 | Takaya et al. |
| 5,649,194 A | 7/1997 | Miller et al. |
| 5,649,195 A | 7/1997 | Scott et al. |
| 5,675,787 A | 10/1997 | Miller et al. |
| 5,675,802 A | 10/1997 | Allen et al. |
| 5,689,706 A | 11/1997 | Rao |
| 5,698,121 A | 12/1997 | Kosaka et al. |
| 5,740,175 A | 4/1998 | Wakeman et al. |
| 5,740,433 A | 4/1998 | Carr et al. |
| 5,745,753 A | 4/1998 | Mosher, Jr. |
| 5,765,171 A * | 6/1998 | Gehani et al. ............... 707/203 |
| 5,768,519 A | 6/1998 | Swift et al. |
| 5,774,552 A | 6/1998 | Grimmer |
| 5,787,262 A | 7/1998 | Shakib |
| 5,787,441 A | 7/1998 | Beckhardt |
| 5,787,442 A | 7/1998 | Hacherl et al. |
| 5,796,999 A | 8/1998 | Azagury et al. |
| 5,802,301 A | 9/1998 | Dan |
| 5,806,074 A | 9/1998 | Souder et al. |
| 5,812,793 A | 9/1998 | Shakib |
| 5,819,272 A | 10/1998 | Benson |
| 5,832,222 A | 11/1998 | Dziadosz |
| 5,832,225 A | 11/1998 | Hacherl et al. |
| 5,832,275 A | 11/1998 | Olds |
| 5,832,487 A | 11/1998 | Olds |
| 5,832,506 A | 11/1998 | Kuzma |
| 5,832,514 A | 11/1998 | Norin et al. |
| 5,845,116 A | 12/1998 | Saito et al. |
| 5,884,322 A | 3/1999 | Sidhu et al. |
| 5,926,816 A | 7/1999 | Bauer et al. |
| 5,950,198 A | 9/1999 | Falls |
| 5,968,121 A | 10/1999 | Logan et al. |
| 5,968,131 A | 10/1999 | Mendez et al. |
| 5,978,813 A * | 11/1999 | Foltz et al. .................. 707/201 |
| 5,996,057 A | 11/1999 | Scales, III et al. |
| 6,049,809 A | 4/2000 | Raman et al. |
| 6,052,724 A | 4/2000 | Willie et al. |
| 6,058,401 A | 5/2000 | Stamos et al. |
| 6,138,124 A | 10/2000 | Beckhardt |
| 6,192,365 B1 * | 2/2001 | Draper et al. ............... 707/101 |
| 6,212,557 B1 | 4/2001 | Oran |
| 6,247,017 B1 | 6/2001 | Martin |
| 6,301,589 B1 | 10/2001 | Hirashima et al. |
| 6,324,571 B1 | 11/2001 | Hacherl |
| 6,343,299 B1 | 1/2002 | Huang et al. |
| 6,377,950 B1 | 4/2002 | Peters et al. |
| 6,412,017 B1 | 6/2002 | Straube et al. |
| 6,427,209 B1 | 7/2002 | Brezak, Jr. et al. |
| 6,446,077 B2 | 9/2002 | Straube et al. |
| 6,446,092 B1 | 9/2002 | Sutter |
| 6,453,383 B1 | 9/2002 | Stoddard et al. |
| 6,457,053 B1 | 9/2002 | Satagopan et al. |
| 6,516,327 B1 | 2/2003 | Zondervan et al. |
| 6,529,917 B1 | 3/2003 | Zoltan |
| 6,532,479 B2 | 3/2003 | Souder et al. |
| 6,539,381 B1 | 3/2003 | Prasad et al. |
| 6,643,670 B2 | 11/2003 | Parham et al. |
| 6,647,393 B1 | 11/2003 | Dietterich et al. |
| 6,751,634 B1 | 6/2004 | Judd |
| 6,823,338 B1 | 11/2004 | Byrne et al. |
| 6,865,576 B1 | 3/2005 | Gong et al. |
| 6,879,564 B2 | 4/2005 | Parham et al. |
| 6,901,433 B2 | 5/2005 | San Andres et al. |
| 7,035,922 B2 | 4/2006 | Parham |
| 7,162,499 B2 | 1/2007 | Lees et al. |
| 7,184,359 B1 | 2/2007 | Bridgewater et al. |
| 7,185,359 B2 | 2/2007 | Schmidt et al. |
| 7,200,847 B2 | 4/2007 | Straube et al. |
| 7,430,744 B2 | 9/2008 | Straube et al. |
| 2006/0026165 A1 | 2/2006 | Mohamed et al. |
| 2006/0085428 A1 | 4/2006 | Bozeman et al. |
| 2006/0136484 A1 | 6/2006 | Straube et al. |
| 2006/0168120 A1 | 7/2006 | Parham |
| 2006/0184589 A1 | 8/2006 | Lees et al. |
| 2006/0200831 A1 | 9/2006 | Straube et al. |
| 2007/0162519 A1 | 7/2007 | Straube et al. |

FOREIGN PATENT DOCUMENTS

| | | |
|---|---|---|
| EP | 0 661 651 A1 | 7/1995 |
| EP | 0 663 640 A1 | 7/1995 |
| EP | 0881569 | 12/1998 |
| WO | WO9822892 | 6/1998 |
| WO | WO9838564 | 9/1998 |
| WO | WO9829792 | 10/1998 |

| | | |
|---|---|---|
| WO | WO9858313 | 12/1998 |
| WO | WO0045303 | 8/2000 |
| WO | WO0195130 | 12/2001 |

OTHER PUBLICATIONS

Pang et al "Implementation and Performance of Cluster-Based File Replication in Large-Scale Distributed Systems", 1992 IEEE, pp. 100-103.*
Hac et al "Algorithm for File Replication in a Distributed System", 1988 IEEE, pp. 206-214.*
"Active Directory Service Interfaces-The Easy Way to Access and Manage LDAP-Based Directories (Windows NT 4.0)," Microsoft Corp., Feb. 1997, [10 pages].
"Advanced Server/9000 Concepts and Planning Guide," HP System Networking, Publication Date: 1997.See in particular Chapter 2 and Chapter 5, from p. 145-150, "How Directory Replication Works" http://docs.hp.com/en/J2716-90016/J2716-90016.pdf.
"Banyan works out with Vines 5.50: Banyan raises the bar for directory services," Lan Magazine, vol. 8(4), Apr. 1993, pp. 12(2).
"Comparing Microsoft Active Directory to Novell's NDS," Microsoft Corporation, Publication Date 1998, pp. 1-14 [printed as 26 pages].
"DCE Application Development guide," Open Software Foundation, Dec. 27, 1991, Chapter 22, pp. 1-5 and Chapter 24, pp. 1-4.
"Directory Services for a Distributed Computing Environment," Open Software Foundation, Apr. 1991, pp. 1-10.
"File Name Mapping Method Permitting Network Location Transparency," IBM Technical Disclosure Bulletin, vol. 26(7B): 3791-3794, Dec. 1983.
"Managing networked workstations," IEEE Spectrum, Apr. 1992, pp. 55, 56, 58.
"Microsoft Active Directory Service Interfaces: ADSI Open Interfaces for Managing and Using Directory Services", Microsoft Corporation, 1999, [36 pages].
"NetOp® Policy Server, Version 3.0, Quick Guide," Document revision: 2004313, 1981-2005, [30 pages].
"Novell Directory Services—White Paper," Publication date: 1998. [8 pages]. http://www.cts-net.com/NOV-NDS%20White%20Paper.html.
"Xcopy Function for Access Control Profiles," IBM Technical Disclosure Bulletin, vol. 37(1):573-574, 1994.
Acevedo, et al. "Highly available directory services in DCE," In Proceedings of the Symposium on Principles of Distributed Computing (PODC'95), Aug. 1995, pp. 387-391.
Amir, Yair. "Replication Using Group Communication Over a Partitioned Network," Ph. D. Dissertation, Institute of Computer Science, The Hebrew University of Jerusalem, Israel, 1995, [95 pages].
Ashfield, et al. "System-independent file management and distribution services" IBM Systems Journal, IBM Corp., vol. 28, No. 2, Jan. 1989, pp. 241-259.
Austin, et al., "Technique for replicating distributed directory information," IBM Technical Disclosure Bulletin, IBM Corp. ,vol. 33, No. 12, May 1, 1991, pp. 113-120, [4 pages].
Beedubail et al., "An Architecture for Object Replication in Distributed Systems," Proceedings of the International Conference on Parallel and Distributed Processing Techniques and Applications, PDPTA'97, Department of Computer Science, Texas A&M University, Technical Report (TR_96-006), Mar. 1996, [21 pages].
Bennett et al., "An Analysis of Replication Strategies for X.500-like Distributed Directories," Workshop on the Management of Replicated Data, IEEE Computer Society Press, Nov. 1990, pp. 137-142.
Bierer et al., "NetWare 4 for Professionals," New Riders Publishing, pp. 364-374, 1993.
Bierer et al., "NetWare 4 for Professionals," New Riders Publishing, pp. 343-363, 420-421, 432-435, and 971-1045 (1993).
Bloch et al., "A weighted voting algorithm for replicated directories," Journal of the ACM, 34(4), ACM, Oct. 1987, pp. 859-990.
Brown et al., "NetWare users getting directory assistance," Network World, May 3, 1993, pp. 40-42.
Cabrera et al., "Advances in Windows NT Storage Management," IEEE Computer, Publication Date: Oct. 1998, pp. 48-54, vol. 31, No. 10.
Campbeil et al., "Considerations of Persistence and Security in Choices, an Object-Oriented Operating System," In Proceedings on the International Workshop on Computer Architectures to Support Security and Persistence of Information, May 8-11, 1990: pp. 290-300.
Carter et al., "Khazana an Infrastructure for Building Distributed Services," Proceedings of the ICDCS'98, IEEE, May 1998, [10 pages].
Chappell, David. "New distributed services give Windows NT a boost in large networks", May 1998, pp. 1-7.
Cheung, Roger Y. M. "From Grapevine to Trader: The Evolution of Distributed Directory Technology," Proceedings of the 1992 conference of the Centre for Advanced Studies on Collaborative Research—vol. 2, Ontario, Canada 1992, pp. 375-389.
Cho, Haengrae. "Catalog Management in Heterogeneous Distributed Database Systems," Communications, Computers and Signal Processing, 1997. '10 Years PACRIM 1987-1997—Networking the Pacific Rim', IEEE, Aug. 1997, pp. 659-662.
Day, Michael, "Network Directory Services: Major Technology Behind 4.0," Lan Times Special Report/Netware 4.0, May 10, 1993, pp. 60-61 [see p. 3 of 4].
Ferreira et al., "Using LDAP in a Filtering Service for a Digital Library," 5th DELOS Workshop, Budapest, Nov. 1997, [5 pages].
Fowler et al., "A User-Level Replicated File System," In *Proceedings of the Summer 1993 USENIX Technical Conference,* Cincinnati, Ohio, Jun. 21-25, 1993: pp. 279-290.
Hawkins, Gary, "NetWare 4.0 Directory Services," Enterprise Computing, May 17, 1993, pp. 49-52.
Heidemann, et al., "File-System Development with Stackable Layers," University of California, Los Angeles, ACM Transactions on Computer Systems, vol. 12(1), (1994) pp. 58-89.
Howes, Timothy A., "The Lightweight Directory Access Protocol: X. 500 Lite," Technical Report CITI TR 95-8, University of Michigan, Jul. 1995, pp. 1-9.
Jagadish et al., "Flexible list management in a directory," In Proceedings of the Seventh International Conference on Information and Knowledge Management (CIKM), ACM, Washington, DC, Nov. 1998, pp. 10-19.
Kaashoek et al, "Using Group Communication to Implement a Fault-Tolerant Directory Service," Proceedings of the 13th International Conference on Distributed Computing Systems, IEEE, May 1993, pp. 130-139.
Kazar, et al., "DEcorum File System Architectural Overview," USENIX Summer Conference, Anaheim, California. Publication Date: Jun. 1990, pp. 1-13.
Keleher, Peter J. "Decentralized Replication Mechanisms in Deno," University of Maryland Computer Science Department, *Technical Reports from UMIACS and Technical Reports of the Computer Science Department,* CS-TR-3940 UMIACS, UMIACS-TR-98-54, Oct. 1998, [6 pages].
Kumar et al., "Log-Based Directory Resolution in the Coda File System," 1993 IEEE, pp. 202-213.
Lee et al., "A New Replication Strategy for Unforeseeable Disconnection under Agent-Based Mobile Computing System," 1998 International Conference on Parallel and Distributed Systems (ICPADS'98), IEEE, 1998, [8 pages].
Maass, Henning. "Open Mobility Management Platform With Directory-Based Architecture and Signalling Protocols," Open Architectures and Network Programming, IEEE, 1998, pp. 72-87.
Mann et al., "An Algorithm for Data Replication," Report 46, DEC System Research Center, Palo Alto, Calif., Jun. 1, 1989, [61 pages].
Martin et al., "Development of the VAX Distributed Name Service," *Digital Technical Journal,* vol. 9, pp. 9-15 (1989).
Mullender et al., "Amoeba: A Distributed Operating System for the 1990s", IEEE Computer 23, May 1990, pp. 44-53 [17 pages].
Ordille et al., "Distributed Active Catalogs and Meta-Data Caching in Descriptive Name Services," Thirteenth International IEEE Conference on Distributed Computing Systems, May 1993, pp. 1-10.
Purdin et al., "A File Replication Facility for Berkeley Unix," *Software-Practice and Experience,* vol. 17(12), pp. 923-940 (1987).

Reiher et al., "A User-Level File Replication Middleware Service," Proceedings of the SIGCOMM Workshop on Middleware, Publication Date: Aug. 1995, [4 pages]. http://lasr.cs.ucla.edu/travler/rumor_position_paper.html.

Ruiz et al., "Netware 4.0: A Directory to the Enterprise," Data Communications, Sep. 21, 1992, pp. 53-56, 58 and 60.

Sandhu et al., "Cluster-Based File Replication in Large-Scale Distributed Systems," Computer Systems Research Institute, University of Toronto, vol. 20(1), pp. 91-102 (1992).

Sarin et al., "A flexible algorithm for replicated directory management," In Proceedings of the Ninth International Conference on Distributed Computing, Systems, IEEE, Jun. 1989, pp. 456-464.

Satyanarayanan et al., "Coda: A Highly Available File System for a Distributed Workstation Environment," IEEE 19(4): pp. 447-459, 1990.

Satyanarayanan, Mahadev, "Scalable, Secure, and Highly Available Distributed File Access," *IEEE*, pp. 9-21 (1990).

Schulman, Mark, "Que's Guide to Lotus Notes," pp. 51-55, 268-285, and 290-312 (1993).

Severance, Charles. "Could LDAP Be the Next Killer DAP?," *Computer*, vol. 30, No. 8, Aug. 1997, pp. 88-89.

Siegel et al., "Deceit: A Flexible Distributed File System," *Technical Report for Department of Computer Science*, Cornell University, Ithaca, New York, pp. 1-34, (1989).

Skarra et al., "A File System Interface for Concurrent Access," ACM SIGOPS European Workshop, Publication Date: 1994, pp. 128-133.

Stern, Hal, Managing NFS and NIS, Chapters 5 and 6, 1991, pp. 89-137. "Data Communication Networks Directory," CCITT IXth Plenary Assembly, Melbourne, vol. VIII, Nov. 1988, pp. 3-48.

Symborski, "Updating Software and Configuration Data in a Distributed Communications Network," 1988 IEEE, pp. 331-338.

Walker et al.,. "The LOCUS Distributed Operating System," In Proceedings of the 9th Symposium on Operating Systems Principles, *Operating Systems Review*, ACM, vol. 17(5), pp. 49-70 (1983).

Wedde et al., "Operating System Support for Adaptive Distributed Real-Time Systems in Dragon Slayer," *Operating Systems Review*, vol. 23(3):126-136, (1989).

Weider et al., "LDAP Multi-Master Replication Protocol", Nov. 1997, [17 pages].

Yeo et al., "A Taxonomy of issues in Name Systems Design and Implementation," Operating System Review, vol. 27(3): pp. 4-18, Jul. 1993.

Sarin. Sunl K. and Lynch, Nancy A. *Discarding Obsolete Information in a Replicated Database System*. IEEE, Jan. 1987, pp. 39-47.

Schleimer, S. et al. *Winnowing: Local Algorithms for Document Fingerprinting*. Proceedings of the 2003 ACM SIGMOD International Conference on Management of Data, Jun. 9-12, 2003, pp. 76-85, 2003.

Shukla, Prashant. *Introduction to Novell Replication Services* [online], [retrieved on Dec. 14, 2007]. Retrieved from the internet: <URL: http://support.novell.com/techcenter/articles/dnd19970802.html>.

Sidhu, D., et al. *Finding Disjoint Paths in Networks*. 1991 ACM.

*Solaris ONC+, Network Information Service Plus (NIS+): an Enterprise Naming Service* [online], Sun, [retrieved on Jun. 26, 2006]. Retrieved from the internet: <URL: http://www.sun.com/software/whitepapers/wp-nisplus/>.

Sonntag, Susann et al. *Adaptability Using Reflection*. In Proceedings of the Twenty-Seventh Hawaii International Conference on System Sciences, 1994, pp. 383-392.

Srinivasan, V. and Mogus, J. *Spritely NFS: Experiments with and Implementation of Cache-Consistency Protocols*, Chapter 6.2 "Delaying the SNFS close operation." Research Report 89/5, Digital Equipment Corporation, Mar. 1989 [online], [retrieved on Dec. 28, 2007]. Retrieved from the internet: <URL: http://www.hpl.hp.com/techreports/Compaq-DEC/WRL-89-5.pdf>.

Stokes, E., et al., *Lightweight Directory Access Protocol (version 3) Replication Requirements*. IETF RFC 3384, Oct. 2002 [retrieved on Dec. 26, 2007]. Retrieved from the internet: : <URL: http://www.ietf.org/rfc/rfc3384.txt >.

Stokes, Ellen and Good, Gordon. "The LDUP Replication Update Protocol, Filename: draft-ietf-Idupprotocol-00.txt.," Internet-Draft, Oct. 22, 1999. [15 pages].

Suel, T.; Noel, P. and Trendafilov, D. *Improved File Synchronization Techniques for Maintaining Large Replicated Collections over Slow Networks*. IEEE International Conference on Data Engineering, Mar. 2004, pp. 1-12.

Swafford, Steven. *CodeSnip: Enforcing Unique Password Strength in an Oracle Database Based Upon a Role* [online], [retrieved on Dec. 13, 2007]. Retrieved from the internet: <URL: http://aspalliance.com/articleViewer.aspx?aId=746&pId=-1>.

*System Administration Guide: Naming and Directory Service (NIS+)* [online], 1994-2007 [retrieved on Jun. 26, 2007]. Retrieved from the internet: <URL: http://docs.sun.com/app/docs/doc816-4558>.

Tanenbaum, Andrew S. *Distributed Operating Systems*. Prentice Hall 1995.

Teodosiu, Dan et al. *Optimizing File Replication over Limited-Bandwidth Networks using Remote Differential Compression*. MSR-TR-2006-157, pp. 1-16.

Terry, D. B. et al. *Session Guarantees for Weakly Consistent Replicated Data*. Proceedings of the IEEE Conference on Parallel and Distributed Information Systems (PDIS), Sep. 1994, pp. 140-149.

*The Administrative Authority Model*. Chapter 10 of the X.501 Standard, Nov. 1993, pp. 1-165.

*The History of Notes and Domino* [online]. [Retrieved on Sep. 21, 2009] DeveloperWorks Lotus, Web Team, IBM, Dec. 20, 2005, pp. 1-24. Retrieved from: http://www.ibm.com/developerworks/lotus/library/ls-NDHistory/>.

The Open Group. DCE 1.1: Remote Procedure Call. C706, Oct. 1997, [748 pages].

Thomas, Robert H. *A Majority Consensus Approach to Concurrency Control for Multiple Copy Databases*. ACM Transactions on Database Systems, vol. 4, No. 2, Jun. 1979, pp. 180-209.

*Transmission Control Protocol, Darpa Internet Program, Protocol Specification*. Information Sciences Institute, IETF RFC 793, Sep. 1981, [91 pages] [retrieved on Dec. 28, 2007]. Retrieved from the internet: <URL: http://www.ietf.org/rfc/rfc793.txt >.

Trendafilov, D; Memon, N. and Suel, T. Zdelta: *An Efficient Delta Compression Tool*. Technical Report TR-CIS-2002-02, Polytechnic University, Jun. 26, 2002, pp. 1-14.

Tridgell, Andrew and Mackerras, Paul. *The Rsync Algorithm*. Technical Report TR-CS-96-05, Australian National University, Jun. 1996, pp. 1-6.

Tridgell, Andrew. *Efficient Algorithms for Sorting and Synchronization*. PhD Thesis, Australian National University, Feb. 1999, pp. 1-106.

*Troubleshooting File Replication Service* [online]. Microsoft TechNet, Microsoft Corporation, [retrieved on Oct. 31, 2007]. Retrieved from internet: <URL: http://www.microsoft.com/technet/prodtechnol/windows2000serv/technologies/activedirectory/maintain/opsguide/part1/adogd11.mspx>.

*Tspaces—Computer Science Research at Almaden* [online]. IBM, [retrieved on Nov. 2, 2007], pp. 1. Retrieved from internet: <URL: http://www.almaden.ibm.com/cs/tspaces/>.

*Understanding X.500—The Directory* [online], [retrieved on Dec. 13, 2007]. Retrieved from the internet: <URL: http://sec.cs.kent.ac.uk/x500book/>.

*UNIVAC 490* [online]. Wikipedia, [retrieved on Oct. 31, 2007]. Retrieved from internet: <URL: http://en.wikipedia.org/wiki/UNIVAC_490>.

*University of Oregon Route Views Project*. Advanced Network Technology Center [online], University of Oregon, [retrieved on Jun. 26, 2007]. Retrieved from the internet: <URL: http://www.routeviews.org/2001>.

*UNIX Programmer's Manual*. Bell Telephone Laboratories, Seventh Edition, vol. 1, Jan. 1979, pp. 1-404.

*Using Server Failover* [online], 2001 [retrieved on Jun. 26, 2007]. Retrieved from the internet: <URL: http://livedocs.macromedia.com/coldfusion/5.0/Advanced_ColdFusion_Administration/optimize3.htm>.

Vahalia, Uresh. Unix Internals: The New Frontier, Prentice Hall, 1996, pp. 327.

Veizades, J., et al. *Service Location Protocol*. IETF RFC 2165, Jun. 1997, [67 pages]. [retrieved on Dec. 28, 2007]. Retrieved from the internet: : <URL: http://www.ietf.org/rfc/rfc2165.txt >.

*ViceVersa Software Features* [online]. [Retrieved on Nov. 2, 2007], pp. 1-3. Retrieved from internet: <URL: http://www.tgrmn.com/web/popup/feat_comp.htm>.

*View of /arc/arcpack.c* [online]. SourceForge.net Repository, [retrieved on Nov. 2, 2007], pp. 1-7. Retrieved from internet: <URL: http://arc.cvs.sourceforge.net/arc/arc/arcpack.c?revision=1.1&view=markup>.

Wang, Randolph Y., and Anderson, Thomas E. *xFS: A Wide Area Mass Storage File System.* Computer Science Division, University of California, Dec. 1993, pp. 1-8.

Weider, Chris et al. *LDAP Multi-Master Replication Protocol.* IETF Draft, Nov. 1997, pp. 1-11.

Weiser, Russel F. and Stokes, Ellen. *LDAP V3 Replication Requirements.* Internet Draft, Feb. 19, 1999, [15 pages].

Welch, Terry A. *A Technique for High-Performance Data Compression.* T A Computer. vol. 17, Jun. 1984, pp. 8-19.

Westerlund, Assar and Danielsson, Johan. *Arla—A Free AFS Client.* In Proceedings of the 1998 USENIX, Freenix Track, Jun. 1998, pp. 1-4.

*Intel Processor Identification and the CPUID Instruction* [online], Intel Corporation, Mar. 2003 [retrieved on Jun. 26, 2007]. Retrieved from the internet: <URL: ftp://download.intel.com/support.processors/procid/24161815.pdf>.

*Intel® Pentium® III Processor—Low Power Module* [online], [retrieved on Dec. 13, 2007]. Retrieved from the internet: <URL: http://www.intel.com/design/support/faq/embed_proces/pentiumiii_lp_mod.htm>.

Irmak, U. and Suel, T. *Hierarchical Substring Caching for Efficient Content Distribution to Low-Bandwidth Clients.* 14th International WWW Conference, May 2005, pp. 1-11.

Irmak, U.; Mihaylov, S. and Suel, T. *Improved Single-Round Protocols for Remote File Synchronization.* IEEE Infocom Conference, Mar. 2005, pp. 1665-1676.

*ITU-T X.500, Section 11* [online], International Telecommunication Union, Nov. 1993 [retrieved on Jun. 26, 2007]. Retrieved from the internet: <URL: http://www.itu.org>.

*ITU-T X.525, Section 11* [online], International Telecommunication Union, Nov. 1993 [retrieved on Jun. 26, 2007]. Retrieved from the internet: <URL: http://www.itu.org>.

Jain, N.; Dahlin, M. and Tewari, R. *TAPER: Tiered Approach for eliminating Redundancy in Replica Synchronization.* 4th USENIX Conference on File and Storage Technology, FAST, 2005, pp. 1-14.

Jenkins, R. *Hash Functions for Hash Table Lookup* [online]. [Retrieved on Sep. 21, 2007] 1995-1997, pp. 1-9. Retrieved from: http://burtleburtle.net/bob/hash/evahash.html.

*JPEG* [online]. Wikipedia, [retrieved on Mar. 4, 2007]. Retreived from internet: <URL: http://en.wikipedia.org/wiki/Jpeg>.

*Jung—Java Universal Network/Graph Framework* [online], [retrieved on Dec. 12, 2007]. Retrieved from the internet: <URL: http://jung.sourceforge.net/>.

Kantor, B. and Lapsley, P. *Network News Transfer Protocol: A Proposed Standard for the Stream-Based Transmission of News.* IETF RFC 977, Feb. 1986 [retrieved on Dec. 28, 2007]. Retrieved from the internet: <URL: http://www.ietf.org/rfc/rfc977.txt >.

Kittur, Sunil et al. *Fault Tolerance in a Distributed CHORUS/MiX System* [online]. [Retrieved on Dec. 12, 2007] Retrieved from the internet: <URL: http://www.usenix.org/publications/library/proceedings/sd96/full_papers/kittur.ps>.

Kohl, J. and Neuman, C. *The Kerberos Network Authentication Services (V5).* RFC 1510, Sep. 1993, [105 pages].

Kolstad, Rob and Summers-Horton, Karen. *Mapping the UUCP Network.* Proceedings of 1984 USENIX UniForum Conference, Washington, D.C. 1984, pp. 251-257.

Kong, Mike et al. Network Computing System Reference Manual (Prentice-Hall, Upper Saddle River, NJ, USA; 1990; Network computing system was Apollo Computer's implementation of the Networking Computing Architecture (NCA).

Korn, D. et al. *The VCDIFF Generic Differencing and Compression Data Format.* RFC 3284, Jun. 2002, pp. 1-28.

Kulkarni, P. et al. *Redundancy Elimination within Large Collections of Files.* Proceedings of the 2004 USENIX Annual Technical Conference, Boston, MA, Jun. 27-Jul. 2, 2004, pp. 1-15.

Kumar, Puneet et al. *Flexible and Safe Replication of File Conflicts.* Carnegie Mellon University, School of Computer Science (CMU-CS-94-214), Nov. 1994, pp. 1-15.

Kumar, Puneet. *Mitigating the Effects of Optimistic Replication in a Distributed File System.* PhD Thesis, Carnegie Mellon University; Dec. 1994; pp. 1-185.

*Lace—An Introduction: Crisis Averted!* [online]. Socket7, [retrieved on Nov. 2, 2007], pp. 1-5. Retrieved from internet: <URL: http://socket7.net/article/lace-an-introduction/>.

Langford, John. *Multiround Rsync.* Unpublished, Jan. 31, 2001. pp. 1-11.

Legg, S. and Payne A. *LDUP Update reconciliation Procedures.* Internet-Draft, Jun. 25, 1999, [28 pages].

Liskov, Barbara et al. *Replication in the Harp File System.* ACM SIGOPS Operating System Review, vol. 25 No. 5, Oct. 1991, pp. 226-238.

MacDonald, J.P. *File System Support for Delta Compression.* Master's Thesis, UC Berkeley, May 19, 2000, pp. 1-32.

Maffeis, Silvano and Cap, Clemens H. *Replication Heuristics and Polling Algorithms for Object Replication and Replicating File Transfer Protocol.* IFI TR 92.06; Jul. 30, 1992, pp. 1-7.

Manber, Udi and Wu, Sun. GLIMPSE: *A Tool to Search Through Entire File Systems.* University of Arizona Technical Report TR 93-34, Oct. 1993, pp. 1-10.

Manber, Udi. *Finding Similar Files in a Large File System.* Technical Report TR 93-33, Department of Computer Science, Univ. of Arizona, Tucson, Oct. 1993, pp. 1-10.

McKusick, Marshall Kirk. *Twenty Years of Berkeley Unix From AT&T-Owned to Freely Redistributable* [online]. [Retrieved on Oct. 29, 2007]. Retrieved from the internet: <URL: http://www.oreilly.com/catalog/opensources/book/kirkmck.html>.

Merkle, R.C. *A Digital Signature Based on a Conventional Encryption Function.* In a Conference on the Theory and Applications of Cryptographic Techniques on Advances in Cryptology, 1987. pp. 369-378.

Merrells, J. et al. *LDAP Replication Architecture.* IETF draft, Aug. 5, 1998, pp. 1-31.

Mills, David L. *Network Time Protocol (Version 3) Specification, Implementation and Analysis.* RFC 1305, Mar. 1992, pp. 1-120.

Minasi, Mark et al. *Mastering Windows Server 2003*, 2003, pp. 503-504.

Mircrosoft Corporation, "Implementing Database Replication with JRO." *Microsoft Corporation*, Jan. 1999. pp. 1-10.

Mokapetris, R. *Domain Names—Concepts and Facilities.* RFC 1034, Nov. 1987, pp. 1-52.

Moy, John. *The OSPF Specification.* RFC 1131, 1989, [107 pages].

Muthitacharoen, A.; Chen, B. and Mazières, D. *A Low-bandwidth Network File System.* Proceedings of the 18th SOSP, Banff, Canada, Oct. 2001, pp. 174-187.

*NetIQ Migration Suite* [online]. *Net IQ, Solutions form Attachmate, 2000* [retrieved on Mar. 3, 2007]. Retrieved from the internet: <URL: www.netiq.com>.

Neufeld, G. and Gerald, B. *Support for Transactions and Replication in the EAN Directory Service* [online], Dept. of Computer Science, University of British Columbia, [retrieved on Jun. 26, 2007]. Retrieved from the internet: <URL: http://www.dss.bc.ca/dss/tech/papers/ulpas94/ulpaa94.ps.gz>.

*Active Directory LDAP Compliance—White Paper.* Microsoft Corporation, Oct. 2003. pp. 1-16.

*ADIC: Products, DataMgr* [online]. Quantum, [retrieved on Nov. 2, 2007], pp. 1-4. Retreieved from internet: <URL: http://www.adic.com/adicProductShell.jsp?section=10024&item=121891&Page=us/collateral/productsSpecificationDataMgr.jsp>.

Aharoni, Ehud et al. *Restricted Dynamic Steiner Trees for Scalable Multicast in Datagram Networks.* IEEE/ACM Transactions on Networking, vol. 6, No. 3, Jun. 1998, pp. 286-297.

Ajtai, M. et al. *Compactly Encoding Unstructured Inputs with Differential Compression.* Journal of the ACM, vol. 49, No. 3, May 2002, pp. 318-367.

*AlphaWorks: TSpaces: Overview* [online]. IBM, [retrieved on Nov. 2, 2007], pp. 1-2. Retrieved from internet: <URL: http://www.alphaworks.ibm.com/tech/tspaces/>.

AMD64 Technology. *AMD64 Architecture Programmer's Manual vol. 3: General-Purpose and System Instructions.* Advanced Micro Devices, Sep. 2006, pp. 1-466.

Anderson, Anne. *DCE 1.1 Hierarchical Cells Security Functional Specification,* Draft. Oct. 5, 1993, [15 pages].

Aphelion Directory 2003.2 Administration Guide With: Common DUA Service Module (CDSM) Distributed LDAP Service Module (DLSM), Chapter 10.2 "Multi-master Replication Topology" [online] 2003 [retrieved on Dec. 27, 2007]. Retrieved from the internet: <URL: <http://websolver.us.syntegra.com/support/sw/docs/aphelion2003.2/admin/> (click on "Multi-master Replication Topology").

*ATLAS Computing Technical Design Report.* ATLAS Computing Group, Jul. 4, 2005, pp. 1-248.

Bernstein, Philip. *Review: A Majority Consensus Approach to Concurrency Control for Multiple Copy Databases.* [online]. ACM SIGMOD Digital Review 1, 1999 [retrieved on Dec. 20, 2007]. Retrieved from internet: <URL: http://www.informatik.uni-trier.de/~ley/db/journals/dr/Bernstein99.html>.

Bharath-Kumar, Kadaba et al. *Routing to Multiple Destinations in Computer Networks.* IEEE Transactions on Communication, vol. COM-31, No. 3, Mar. 1983, pp. 343-351.

Birrell, Andrew D.; Hisgen, Andy; Jerian, Chuck, Mann, Timothy and Swart, Garret. *The Echo Distributed File System.* Technical Report 111, Digital Equipment Carp. Systems Research Center, Sep. 1993, [26 pages].

Bjørner, N. et al. *Content Dependent Chunking for Differential Compression, The Local Maximum Approach.* MSR Technical Report, Dec. 2006, pp. 1-90.

Bohannon, Philip et al. *Logical and Physical Versioning in Main Memory Databases.* Proceedings of the 23rd VLDB Conference Athens, Greece, 1997, pp. 86-95.

Bowman, C. Mic et al. *Scalable Internet Resource Discovery: Research Problems and Approaches.* Communications of the ACM, vol. 37 Issue 8; Feb. 23, 1994; pp. 1-21.

Braam, Peter J. et al. *The InterMezzo File System.* In Proceedings of the 3rd of the Perl Conference, O'Reilly Open Source Convention, Aug. 1999, pp. 1-10.

Braam, Peter J. *File Systems for Cluster from a Protocol Perspective.* USENIX Technical Conference, Extreme Linux Track, 1999, pp. 1-5.

Broder, A.Z. et al. *Syntactic clustering of the Web* [online]. [Retrieved on Sep. 21, 2007] Proceedings of the 6th International Conference on WWW, Sep. 1997, pp. 1-16. Retrieved from: http://www.std.org/msm/common/clustering.html.

Broder, A.Z. *On the resemblance and containment of documents.* Proceedings of the Compression and Complexity of Sequences, Jul. 11-13, 1997, pp. 21-29.

*Built-in Open File Backup Utility to Local, Remote or FTP Site* [online] Xlink, [retrieved on Dec. 19, 2007] Retrieved from internet: <URL: http://www.xlink2.com/REPLICA/std/open_backup.htm >.

Burns, Randal C. and Long, Darrel D.E. *Efficient Distributed Backup with Delta Compression.* IOPADS, 1997, pp. 1-11.

Byte.com. *New Replication Options in Access, Oracle and Notes.* Byte Magazine Article, Oct. 1995, pp. 1-4.

Byte.com. *Notes Replication: Outstanding in Its Field.* Byte Magazine Article, Apr. 1996, pp. 1-3.

Calvert, Kenneth L.; Doar, Matthew B. and Zegura, Ellen W. *Modeling Internet Topology.* IEEE Communications Magazine, 1997, vol. 35, No. 6, pp. 160-163.

*Can I Rename my Windows 2000 Domain.* Petri IT Knowledgebase. [online], [retrieved on Aug. 1, 2007]. Retrieved from the internet: <URL: http://www.petri.co.il/w2k_domain_rename.htm>.

Carter, Robert L. and Crovella, Mark E. *Server Selection using Dynamic Path Characterization in Wide -Area Networks.* Proceedings of the IEEE Infocom '97; Apr. 7-12, 1997; pp. 1014-1021.

Chan, M.C. and Woo, T.Y.C. *Cache-based Compaction: A New Technique for Optimizing Web Transfer.* Proc. of the IEEE Infocom Conference, 1999, pp. 117-125.

Cheswick, B. *Cget, Cput, and Stage-Safe File Transport Tools for the Internet. USENIX* 1997 Annual Technical Conference, Jan. 6-10, 1997; pp. 1-11.

*Coda File System User and System Administrators Manual: Unix Manual Pages* [online]. [Retrieved on Mar. 4, 2007], pp. 1-90. Retrieved from internet: <URL: http://www.coda.cs.cmu.edu/doc/html/manual-19.html>.

*Colt 1.2.0.* [online], [retrieved on Dec. 12, 2007]. Retrieved from the internet: <URL: http://dsd.lbl.gov/~hoschek/colt/index.html>.

*Commons Collections* [online], [retrieved on Dec. 14, 2007]. Retrieved from the internet: <URL: http://commons.apache.org/collections/>.

Concurrency Control [online], [retrieved on Dec. 27, 2007]. Retrieved from the internet: <URL: http://ftp.research.microsoft.com/users/ccontrol/chapter8.pdf>.

Cox, L.P. et al. *Pastiche: Making Backup Cheap and Easy.* 5th Symposium on Operating System Design and Implementation, Dec. 9-11, 2002, pp. 1-15.

Day, John and Grossman, Gary R. *An RJE Protocol for a Resource Sharing Network.* RFC 725, Apr. 1977, pp. 1-27.

*DCE Distributed File System* [online]. [Retrieved Sep. 21, 2007] Wikipedia, pp. 1-2. Retrieved from http://en.wikipedia.org/wiki/DCE_Distributed_File_System.

Dijkstra. *A Note on Two Problems in Connection with Graphs.* Numerische Mathematik, 1959 (Introducing Dijkstra's algorithm).

Dineen, Terence H. et al. *The Network Computing Architecture and System: An Environment for Developing Distributed Applications.* USENIX Conference, Jun. 1987, pp. 385-398. An Environment for Developing Distributed Applications.

*Directory Services and Military Messaging* [online], CIT03.03 SEIWG Assessment, Joint Warrior Interoperability Demonstration 2004 Final Report, 2004 [retrieved on Jun. 26, 2007]. Retrieved from the internet: <URL: http://www.cwid.js.mil/public/cwid05fr/htmlfiles/c303sei.html>.

Doar, Matthew B. *A Better Model for Generating Test Networks.* Ascom Nexion, 1996, pp. 1-21.

Droms, R. *Dynamic Host Configuration Protocol.* Bucknell University, IETF RFC 2131, Mar. 1997 [retrieved on Dec. 28, 2007]. Retrieved from the internet: <URL: http://www.ietf.org/rfc/rfc2131.txt >.

Eshghi, Kave. *Intrinsic References in Distributed Systems.* Software Technology Laboratory, HP Laboratories Palo Alto, HPL-2002-32, Feb. 7, 2002, pp. 1-8.

eTrust Directory r8 [online], [retrieved on Dec. 28, 2007]. Retrieved from the internet: <URL: http://www.neam.de/uploads/_downloads/etrust_directory_data_sheet.pdf >.

Fetterly, D. et al. *A large-scale study of the evolution of Web pages.* Software—Practice and Experience, vol. 34, No. 2, May 20-24, 2003, pp. 213-237.

*File Replication Pro—Your Solution for File Replication, File Synchronization, & File Backup* [online]. File Replication Pro, [retrieved on Nov. 2, 2007], pp. 1-2. Retrieved from internet: <URL: http://www.filereplicationpro.com/Openfilemanager.html>.

*File Replication Pro* [online]. [Retrieved on Oct. 31, 2007], pp. 1-2. Retrieved from Internet: <URL: http://www.filereplicationpro.com/>.

Fu, K. and Kaashoek, M.F. *Fast and Secure Distributed Read-Only File System.* ACM Transactions on Computer Systems, vol. 20, No. 1, Feb. 2002, pp. 1-24.

Gligor, Virgil D.; Luan, Shyh-Wei; and Pato, Joseph N. *On Inter-Realm Authentication in Large Distributed Systems.* 1992 IEEE Symposium on Research in Security and Privacy, May 4-6, 1992, pp. 2-17.

Gopal, Burra and Udi, Manber. *Integrating Content-based Access Mechanisms with Hierarchical File Systems.* Proceedings of the 3rd Symposium on Operating Systems Design and Implementation, Feb. 1999, pp. 1-15.

Gray, Jim N. *Notes on Data Base Operating Systems.* Lecture Notes in Computer Science, vol. 60: Operating Systems, An Advanced Course; 1978, pp. 393-481.

Gray, Jim, et al. *The Dangers of Replication and a Solution.* SIGMOD 1996, Jun. 1996, pp. 173-182.

Gulbrandsen, A., et al. *A DNS RR for Specifying the Location of Services (DNS SRV).* RFC 2782, Feb. 2000, [12 pages].

Guy, R. G.; Popek, G. J.; Page, Jr., T.W. *Consistency algorithms for optimistic replication.* First IEEE Int'l Conf. on Network Protocols, San Francisco, Cal., 1993.
Guy, Richard G. et a. *Implementation of the Ficus Replicated File System.* Proceedings of the Summer USENIX Conference, Jun. 1990, pp. 63-71.
Guy, Richard G. *Ficus: A Very Large Scale Reliable Distributed File System.* PhD thesis, University of California, Los Angeles (UCLA technical report CSD-910018); Jun. 3, 1991, pp. 1-125.
Gwertzman, J. et al. *The Case for Geographical Push Caching* [online], [retrieved on Dec. 12, 2007]. Retrieved from the internet: <URL: http://citeseer.ist.psu.edu/gwertzman95case.html>.
Hac, Anna, "A Distributed Algorithm for Performance Improvement Through File Replication, File Migration, and Process Migration," *IEEE Transactions on Software Engineering,* vol. 15(11), pp. 1459-1470, (1989).
Haveliwala, T.; Gionis, A. and Indyk, P. *Scalable Techniques for Clustering the Web.* In Proceedings of WebDB, 2000, pp. 1-6.
Heckel, Paul. *A Technique for Isolating Differences Between Files.* Communications of the ACM, vol. 21 No. 4, Apr. 1978, pp. 264-268.
Heidemann, John S. et al. *Primarily Disconnected Operation: Experiences with Ficus.* Proceedings of the 2nd Workshop on Management of Replicated Data; Nov. 1992; pp. 2-5.
Heintze, N. *Scalable document fingerprinting.* 1996 USENIX Workshop on E-Commerce, Nov. 1996, pp. 1-10.
Holbrook, Hugh et al. *Log-Based Receiver-Reliable Multicast for Distributed Interactive Simulation.* Stanford University, 1995 [retrieved on Dec. 28, 2007]. Retrieved from the internet: <URL: http://cs.ecs.baylor.edu/~donahoo/classes/5321/papers/HSC95.pdf>.
*How Rsync Works a Practical Overview* [online]. Samba, [retrieved on Nov. 2, 2007], pp. 1-6. Retrieved from internet: <URL: http://samba.anu.edu.au/rsync/how-rsync-works.html>.
*How to Optimize Active Directory Replication in a Large Network* [online], [retrieved on Jun. 26, 2007]. Retrieved from the internet: <URL: http://support.microsoft.com/kb/244368>.
Howes, Timothy A. *The Lightweight Directory Access Protocol: X. 500 Lite* [online], [retrieved on Nov. 25, 2005]. Retrieved from the internet: <URL: http://www.citi.umich.edu/techreports/reports/citi-tr-95-8.pdf.
Huffaker, B., Plummer, D., Moore, D. and Claffy, K. *Topology Discovery by Active Probing.* In Proceedings of 2002, pp. 1-8.
Hunt, J.W. and McIlroy, M.D. *An Algorithm for Differential File Comparison.* Computer Science Technical Report 41, Bell Labs, Jun. 1976, pp. 1-9.
Hunt, J.W. and Szymansky, T.G. *A Fast Algorithm for Computing Longest Common Subsequences.* Communications of the ACM 20(5), May 1977, pp. 350-353.
*IDEAL Migration* [online], Pointdev, Aug. 2000 [retrieved on Mar. 3, 2007]. Retrieved from the internet: <URL: www.pointdev.com>.
*Implementing Database Replication with JRO* [online]. [Retrieved on Jun. 27, 2007] Microsoft Corporation, Jan. 1999, pp. 1-10. Retrieved from: http://msdn2.microsoft.com/en-us/library/aa140026(office.10,d=printer).aspx.
*Information Technology—Open Systems Interconnection—The Directory: Protocol Specifications.* Recommendation X.519, ISO/IEC 9594-5, 1993, pp. 1-42.
*Installing a Coda Server* [online]. File System User and System Administrators Manual, Chapter 7 [retrieved on Jun. 26, 2007]. Retrieved from the internet: <URL: http://coda.planetmirror.com/doc/html/manual/x1243.html>.
*Intel Architecture Software Developer's Manual vol. 1: Basic Architecture.* Intel Corporation, 1999, pp. 1-369.
Anderson, D and Shanley, T. *Pentium Processor System Architecture.* MindShare, Inc.; chapters 3,4,6 7, 8, 11, 14-16; Appx. A, D (2d ed., 1995).
Gulbrandsen, A., et al. *A DNS RR for Specifying the Location of Services (DNS SRV).* RFC 2052, Oct. 1996, [10 pages].
*Intel Processor CPUID function (available since 486 processors) 6.15.3* [online], Intel Corporation, 1999 [retrieved on Jun. 26, 2007].
Retrieved from the internet: <URL: http://wwvv.intel.com/design/pentiumii/manuals/24319002.pdf>.
*LinkSys PAP2 Router* [online], [retrieved on Dec. 13, 2007]. Retrieved from the internet: <URL: http://www.go2call.com/docs/LinkSysManualConfig.pdf>.
Novell Replication Server [online]. Novell, [Retrieved on Dec. 19, 2007], Retrieved from internet: <URL: http://support.novell.com/techcenter/articles/dnd19970802.html>.
Oracle's SQL-based products, [online] referenced at http://msdn2.microsoft.com/en-us/library/ms15176(printer).aspx. [retrieved on Jan. 3, 2008]. Retrieved from the internet:<URL: http://msdn2.microsoft.com/en-us/library/ms151176(printer).aspx.
*OSF DCE Application Development Guide.* Prentice Hall, 1993.
Repliweb Deployment Suite [online]. [Retrieved on Dec. 19, 2007], Retrieved from internet: <URL: http://www.tkg-usa.com/repliweb.html>.
*Novell Cluster Services for NetWare 5.1* [online], [retrieved on Dec. 14, 2007]. Retrieved from the internet: <URL: http://www.novell.com/products/clusters/ncs101/details.html>.
*Novell Directory Services*—White Paper. Novell, 1993, pp. 1-8.
*Novell eDirectory* v. *Microsoft Active Directory.* Competitive white paper, Novell [online], [retrieved on Dec. 27, 2007]. Retrieved from the internet: <URL: http://www.novell.com/collateral/4621396/4621396.pdf>.
*Novell Introduces NetWare Cluster Services for NetWare 5* [online], [retrieved on Dec. 17, 2007]. Retrieved from the internet: <URL: http://www.hpcwire.com/archives/16286.html>.
Novell's eDirectory, "Partitions" [online], [retrieved on Dec. 28, 2007]. Retrieved from the internet: <URL: http://www.novell.com/documentation/edir871/index.html?page=/documentation/edir871/edir871/data/fbachabc.html.
Novell's Nterprise Branch Office Product [online], [retrieved on Dec. 28, 2007]. Retrieved from the internet: <URL: http://support.novell.com/techcenter/articles/ana20021101.html>.
Ogier, Richard et al. *A Distributed Algorithm for Finding Shortest Pairs of Disjoint Paths.* IEEE Infocom '89, vol. 1, 1989, pp. 173-182.
*OS/360* [online]. Wikipedia, [retrieved on Oct. 31, 2007]. Retrieved from internet: <URL: http://en.wikipedia.org/wiki/OS_360>.
*OSF 1: OSF™ DCE Application Development Guide,* Version 1.0, Prentice-Hall, 1993.
Parker, Jr., et al. *Detection of Mutual Inconsistency in Distributed Systems.* IEEE Transaction of Software Engineering, vol. SE-9, No. 3, May 1983. pp. 240-247.
Parr, G., *A More Fault Tolerant Approach to Address Resolution for Multi-LAN System of Ethernets.* Network Working Group, RFC 1029, May 1988 [retrieved on Dec. 26, 2007]. Retrieved from the internet: <URL: http://www.ietf.org/rfc/rfc1029.txt>.
Pasin, Marcia and Weber, Taisy Silva. *Server Reintegration in a Replicated UNIX File System.* Universidade Federal do Rio Grande do Sul, Investigacion Operativa, 2000, pp. 71-82.
Pato, J. *Hierarchical Trust Relationship for Inter-Cell Authentication* [online], [retrieved on Dec. 12, 2007]. Retrieved from the internet: <URL: http://www.opengroup.org/tech/rfc/mirror-rfc/rfc7.0.txt>.
Paxson, Vern. *End-to-End Routing Behavior in the Internet.* IEEE/ACM Transactions on Networking 5(5), Oct. 1997, pp. 601-615.
*PeerSync—File Replication, File Synchronization, and Continuous Backup Software* [online]. Purple Rage, [retrieved on Nov. 2, 2007], pp. 1-10. Retrieved from internet: <URL: http://www.purplerage.com/peeersync>.
Percival, Colin. *Naïve Differences of Executable Code.* Unpublished Draft Paper, pp. 1-3.
Petersen, K. *Ergodic Theory.* Cambridge University Press, 1983.
Petersen, Karin; Spreitzer, Mike; Terry, Douglas; and Theimer, Marvin. *Bayou: Replicated Database Services for World-wide Applications.* Computer Science Laboratory, Zerox Palo Alto Research Center, 1996, [6 pages].
Pierce, Benjamin. *Harmony: The Art of Reconciliation* [online], [retrieved on Dec. 28, 2007]. Retrieved from the internet: <URL: http://www.cis.upenn.edu/~bcpierce/papers/harmony-tgc-talk-2005.pdf>.
*PKZIP* [online]. Wikipedia, [retrieved on Oct. 31, 2007]. Retrieved from internet: <URL: http://en.wikipedia.org/wiki/PKZIP>.

Polsson, K. *Chronology of Microprocessors1990* [online], 2006-2007, last updated Apr. 10, 2007 [retrieved on Jun. 26, 2007]. Retrieved from the internet: <URL: http://www.islandnet.com/~kpolsson/micropro/proc1990.htm>.

Popek, G. et al. *LOCUS a Network Transparent, High Reliability Distributed System. Proceedings of the Eighth ACM Symposium on Operating Systems Principles,* 1981, pp. 169-177.

Popek, Gerald J. et al. *"Replication in Ficus Distributed File Systems."* Department of Computer Science, University of California, Los Angeles, "Proceedings of the Workshop on Management of Replicated Data," Nov. 1990, pp. 20-25.

Popek, Gerald J. et al. *Rumor: Mobile Access Through Optimistic Peer-To-Peer Replication* [online]. [Retrieved on Dec. 18, 2007], Retrieved from internet: <URL: http://citeseer.ist.psu.edu/guy98rumor.html>.

Popek, Gerald. *The LOCUS Distributed System Architecture* [online]. MIT Press, [retrieved on Oct. 31, 2007], 1996, pp. 1. Retrieved from internet: <URL: http://mitpress.mit.edu/catalog/item/default.asp?ttype=2&tid=6437>.

Quinlan, S. and Dorward, S. Venti: *A New Approach to Archival Storage.* Proceedings of the FAST 2002 Conference on File and Storage Technologies, Jan. 2002, pp. 1-13.

Rabin, Michael. *Fingerprinting by Random Polynomials.* Report TR-15-81, Center for Research in Computing Technology, Harvard University, 1981, pp. 1-14.

Reiher, P., J. S. Heidemann, D. Ratner, G. Skinner, and G. J. Popek. *Resolving file conflicts in the Ficus file system.* [online]. In USENIX Conference Proceedings, Jun. 1994. [Retrieved on Dec. 19, 2007]. Retrieved from internet: <URL: http://citeseer.ist.psu.edu/reiher94resolving.html>.

Rekhter, Y et al. *Border Gateway Protocol 4 (BGP-4).* RFC 1771, Mar. 1995, pp. 1-54.

Rosenbaum, Richard L. and Goldfarb, Stanley I. *Design of the Common Directory Interface for DECnet/OSI.* Digital Technical Journal vol. 8 No. 1; May 31, 1996, pp. 59-67.

*Royalty-Free CIFS Technical Reference License Agreement.* CIFS Protocol, Microsoft [online], [retrieved on Dec. 28, 2007]. Retrieved from the internet: <URL: http://msdn2.microsoft.com/en-us/library/aa302242.aspx>.

*Rsync—Oct. 26, 2007* [online]. Samba, [retrieved on Nov. 2, 2007], pp. 1-49. Retrieved from internet: <URL: http://samba.anu.edu.au/ftp/rsync/rsync.html>.

Ryan, V. et al. *Schema for Representing Java™ Objects in an LDAP Directory.* IETF RFC 2713, Oct. 1999 [retrieved on Dec. 28, 2007]. Retrieved from the internet: <URL: http://www.ietf.org/rfc/rfc2713.txt>.

Saito, Yasushi and Shapiro, Marc. *Optimistic Replication.* ACM Computing Surveys 37(1), 42-81, Mar. 2005.

Saito, Yasushi. *Consistency Management in Optimistic Replication Algorithms.* Jun. 15, 2001 [retrieved on Dec. 28, 2007]. Retrieved from the internet: <URL: http://www.ysaito.com/replica.pdf>.

Saito, Yasushi. *Unilateral Version Vector Pruning Using Loosely Synchronized Clocks.* Hewlett-Packard Labs, Storage Systems Department, Technical Report; Mar. 5, 2002; pp. 1-8.

Coulouris et al., *Distributed Systems—Concepts and Design,* 1998, Sections 8.4 and 10.9, pp. 211-225 and 293-299.

Droms. *Dynamic Host Configuration Protocol.* Request for Comments: 2131. Mar. 1997. [retrieved on Jan. 31, 2008]. Retrieved from the internet: <URL: http://www.ietf.org/rfc/rfc2131.txt.

Petersen, Karin et al. *Bayou: Replicated Database Services for WorldWide Applications.* Proceedings of the 7th SIGOPS European Workshop, Sep. 1996; pp. 275-280.

Stokes et al. *Lightweight Directory Access Protocol (version 3) Replication Requirements.* Request for Comments: 3384. Oct. 2002. [retrieved on Jan. 23, 2008]. Retrieved from the internet: <URL: http://ietf.org/rfc/rfc3384.txt>.

*Which Directory Offers the Best LDAP Server?* White paper, Novell [retrieved on Dec. 28, 2007]. Retrieved from the internet: <URL: http://www.novell.com/info/collateral/docs/4621218.01/4621218.pdf> (No Date).

*Why is there a /vice/db/servers file?, Coda File System* [online], [retrieved on Jun. 26, 2007]. Retrieved from the internet: <URL:http://www.coda.cs.cmn.edu/misc/vice-db-servers.html>.

Wolfson, Ouri and Milo, Amir. *Multicast Policy and its Relationship to Replicated Data Placement,* 1991, pp. 181-205.

Wong, K.C. et al. *Directory Replication in Distributed Systems,* in The Proceedings of the first annual Workshop for the ACM Special Interest Group on Forth—SIGForth '89, 1989, pp. 123-127.

*X.500 and DAP* [online], [retrieved on Jun. 26, 2007]. Retrieved from the internet: <URL: http://www.itu.int/rec/T-Rec-X.500-199708-S/en>.

*X500 and LDAP* [online], [retrieved on Jun. 26, 2007]. Retrieved from the internet: <URL: http://www.collectionscanada.ca/iso/ill/document/ill_directory/X_500andLDAP.pdf>.

*X.500,* [online] referenced at http://java.sun.com/products/jndi/tutorial/ldap/models/x500.html. [retrieved on Jan. 2, 2008]. Retrieved from the internet: <URL: http://java.sun.comiproducts/jndi/tutorial/ldap/models/x500.html (No Date).

*Xerces Java Parser 1.4.4* [online], [retrieved on Dec. 26, 2007]. Retrieved from the internet: <URL: http://xerces.apache.org/xerces-j/> (No Date).

*Xerox PARC's Bayou Project* [online], last edited Jun. 25, 1999 [retrieved on Jun. 26, 2007]. Retrieved from the internet: <URL: http://www2.parc.com/csl/projects/bayou/>.

Xiong, Ming et al. Mirror: *A State-Conscious Concurrency Control Protocol for Replicated Real-time Databases,* IEEE Electron Devices Society 1990 Solid-State Sensor and Actuator Workshop, Hilton Head Island, SC, Jun. 4-7, 1990, pp. 20-29.

Zegura, Ellen W., Calvert, Kenneth L. and Bhattacharjee, Samrat. *How to Model an Internetwork,* IEEE Infocom, Mar. 24-28, 1996, pp. 594-602.

Zeilenga, K. *Named Subordinate references in Lightweight Directory Access Protocol (LDAP) Directories.* RFC 3296, Jul. 2002.

Zhou, Wanlei et al., *Distributed Object Replication in a Cluster of Workstations,* IEEE 2000, May 14-17, 2000, pp. 889-894.

Non-Final Office Action dated Nov. 2, 2006 filed in U.S. Appl. No. 11/408,654 (now U.S. Patent No. 7,430,744); 17 pages.

Notice of Allowance dated Apr. 27, 2007 filed in U.S. Appl. No. 11/408,654 (now U.S. Patent No. 7,430,744); 17 pages.

Notice of Allowance dated Sep. 17, 2007 filed in U.S. Appl. No. 11/408,654 (now U.S. Patent No. 7,430,744); 15 pages.

Notice of Allowance dated Apr. 18, 2008 filed in U.S. Appl. No. 11/408,654 (now U.S. Patent No. 7,430,744); 9 pages.

Non-Final Office Action dated Nov. 16, 2009 filed in U.S. Appl. No. 11/688,760; 14 pages.

Notice of Allowance dated Apr. 12, 2010 filed in U.S. Appl. No. 11/688,760; 4 pages.

\* cited by examiner

URGENT REPLICATION FACILITY

RELATED APPLICATIONS

This application is a continuation of U.S. patent application Ser. No. 10/154,014, filed May 23, 2002, which is a continuation of U.S. patent application Ser. No. 08/673,929, filed Jul. 1, 1996, now U.S. Pat. No. 6,412,017, both of which are hereby incorporated by reference in their entirety.

BACKGROUND

In a distributed network environment, multiple copies of replicated data, such as multiple copies of files, objects, directory structures, programs or databases, are typically distributed throughout the network. For example, in a wide area network (WAN) comprised of multiple local area networks (LANs), a separate copy of replicated data may reside in at least one file server or workstation located on each of the LANs.

A benefit to having replicated data in the above-described distributed network includes facilitating access to the replicated data by each of the nodes on the network. Nodes may simply obtain the desired data locally on their LAN rather than seeking the data from another node on the WAN in a perhaps more costly and time-consuming manner. In addition, replicated data helps to distribute the load on any given node that would otherwise have to maintain the data and respond to all requests for such data from all other nodes on the network. A further benefit includes enhancing system reliability, e.g., no one node (which may fail) exclusively possesses access to required data. Databases, network directory services and groupware are typical products that take advantage of replication.

Since the replicated data may change and multiple copies of the replicated data are distributed throughout the network, replication facilities must typically employ some scheme for reconciling any differences and ensuring a certain amount of consistency between the replica set. A replica set is considered to have strong consistency if the changes to the data are reconciled simultaneously throughout the set at some ordained time. Weak consistency is a concept which allows the replicas to be moderately, yet tolerably, inconsistent at various times.

As can be appreciated, maintaining strong consistency generally requires the use of more resources, e.g., at least in terms of reduced available bandwidth. Moreover, strong consistency becomes more and more impractical, and at some point almost impossible, to guarantee as the numbers of replicas increase in a distributed system. This is mostly due to performance limitations, network partitioning, and the like. Consequently, most replicated systems implement some level of weak consistency.

An improved replication facility which provides a standardized interface for replication that can be used regardless of the underlying file system is described in commonly assigned U.S. patent application Ser. No. 08/181,704, the entire description found therein being incorporated herein by reference. For ease of understanding, the general replication topology described therein can be thought of as a graph of unidirectional edges where changes are transmitted from a source to a destination. Replication occurs pairwise and in one direction. In other words, the destination is responsible for originating a request for replication from the source. This technique is known as pulling, since the destination attempts to pull the data from the source.

In this facility, a cursor is maintained at the destination for each connection (edge) it has to a source from which it pulls data. The cursors track the last change information received by the destination from the respective sources. Using a cursor, when a destination requests updates from a given source, the source provides the destination with 1) a list of objects (or other data structures) that have changed and 2) the type of change which has occurred for each object since the last replication to that destination. To avoid unnecessary transmission, the source also filters from this list any change items which it knows were originated or propagated by the requesting destination. The source then updates the cursor maintained at the destination based upon the replication information provided during that replication cycle.

After the list of changes is received at the destination, each object identified in the list attempts to reconcile itself with its counterpart object at the source using a class-specific reconciler. Class specific reconcilers allow each class of object to define for itself what it means to be consistent with other replica objects in its class. If a class specific reconciler is not available for a given data structure, e.g., a text file, then a default reconciler is used, which utilizes, for example, a "last writer wins" algorithm.

Because the above replication facility is "pull" driven by the destination, replication data is only sent to the destination at discrete intervals of time, usually set according to policies defined by the network system administrator and/or the system administrators of the source and destination. Moreover, to conserve network resources (such as available bandwidth), the discrete intervals of time are often set so as to provide only weak consistency.

As a result of the delay between time intervals, a relatively substantial amount of time may occur between replications. Although some delay is ordinarily acceptable with many types of replicated data, significant potential problems may arise with other types of data structures. In particular, changes to certain classes of objects such as password or access rights changes to user objects cannot be unduly delayed if system security is to be maintained.

As discussed above, the solution of decreasing the time interval between replications is not always practicable or even possible. Other solutions have been considered such as 1) tracking the differences between changed data structures to reduce the amount of data that needs to be transmitted during replication, i.e., data logging, or 2) expediting the replication of certain objects. However, such prior art solutions have required that the replicas possess both substantial knowledge of the complete replication topology and/or intimate knowledge of the operating environment of the other replicas. In other words, the replicas need to possess knowledge and/or assurance that all replicas are of similar implementation, e.g., that the replicas have been implemented on uniform homogeneous object sets thereby obviating the above difficulties. As such, these solutions are not amenable to a distributed system wherein the replicas may have different file systems and/or many object types. Similarly, objects created by third parties cannot be easily replicated unless those objects are created with specific knowledge of the topology and file systems in which they may be replicated.

SUMMARY

Accordingly, a primary objective of the present invention is to provide a system and method of efficiently replicating data objects in a distributed system of replicas.

In accomplishing that objective, it is an aim of the invention to provide a replication facility that maintains incremental differencing information and replicates the differencing information upon a request for replication.

It is also an objective of the invention to provide a replication facility that enables the expedited replication of certain data objects deemed urgent.

It is a related objective to provide a replication facility wherein an object may initiate its propagation to other replicas in the system.

Another objective of the invention is to provide a system and method for replicating objects in an object-oriented environment.

Still another objective of the invention is to provide a system and method for replicating objects wherein any object can be replicated throughout one or more replicas in the system without the need for the object to have knowledge of the replication topology or the operating environment.

It is a related objective to provide a replication facility that is extensible and replicates objects independent of the type of file systems used to store those objects.

Briefly, the present invention provides a system and method for expediting the replication of at least one specified object to a replica in a distributed computer system. A source object informs a source replica that it has changed, and the source extracts change information from the object. The source replica transmits information representative of the change to a destination replica, and the information is received at destination replica. The destination replica extracts the change information from the received information, and provides the change information to a replica object of the destination.

Other objects and advantages will become apparent from the following detailed description when taken in conjunction with attached drawings, in which:

Figure 1:
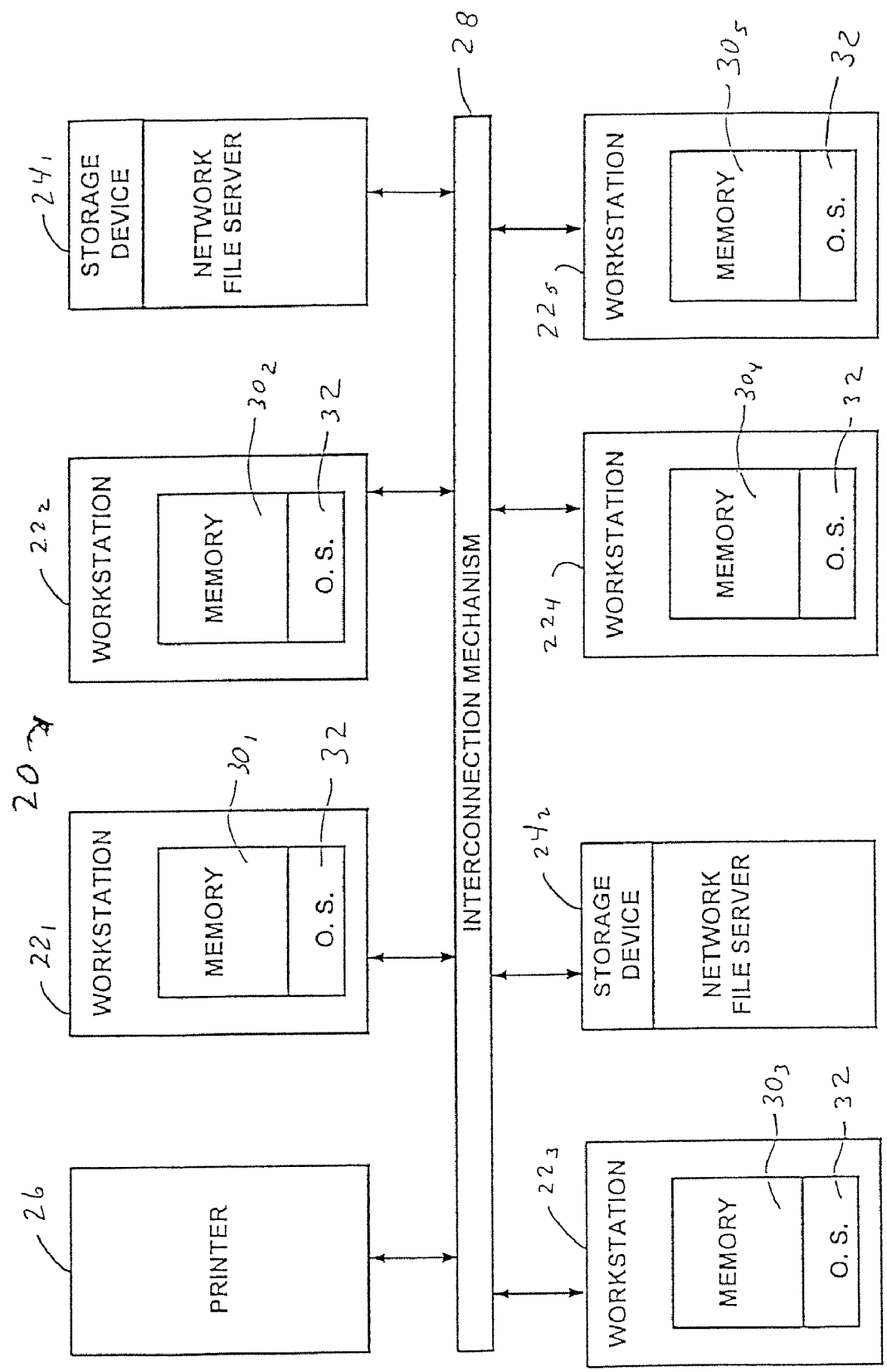
FIG. 1 is a block diagram showing a representative distributed system in which the invention may be implemented and having a number of computer resources connected in a networked fashion.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION

Turning to the drawings and referring first to FIG. 1, there is shown a block diagram of a distributed system, generally designated 20, in which the replication facility of the present invention may be implemented. The distributed system 20 illustrated herein comprises a number of computer-based resources $22_1$-$22_5$, $24_1$-$24_2$ and 26 interconnected in a networked fashion on an interconnection mechanism 28, which may be a local area network, wide area network or other distributed interconnection mechanism. The distributed system shown in FIG. 1 is intended to be exemplary of the type of distributed systems which are suitable for implementing the present invention.

Although not explicitly shown in FIG. 1, the present invention may be implemented in a multiple bus network topology, for example where a network server links multiple networks together, including configurations wherein the networks are running separate network operating systems. In addition, the present invention may be implemented on various types of networking topologies including bus, ring or star topologies.

Physically, the interconnection mechanism 28 may include any well-known data transmission medium, such as coaxial cable, fiber optic cable, or the like, in accordance with a chosen standard for hardware interfaces within each of the devices. Such standards, including ARCnet®, Ethernet® and Token Ring®, and their associated hardware interfaces, are well known in the art, and thus are not described in detail herein. Suffice it to say that a wide variety of interface hardware and software are commercially available to connect computer-based resources in a distributed system.

The distributed system 20 includes client workstations $22_1$-$22_5$ which may be personal computers or the like, each including a memory $30_1$-$30_5$ having a distributed operating system 32 loaded therein. In the described embodiment, each workstation $22_1$-$22_5$ acts as a replica by maintaining a copy of the replicated data in its own file system. There is no requirement that the file systems of the various workstations be the same. Other devices, such as other workstations (not shown), network servers $24_1$-$24_2$, a printer 26 and routers (not shown) are also present in the system 20.

The replication facility of the present invention is capable of replicating data independent of the specific file systems employed. Indeed, the replicas may be maintained in a memory independent of any file system. For example, a replica set may be maintained in the non-volatile random access memory (NVRAM) of a personal data assistant (PDA) or the like. However, for simplicity herein the replicas are generally referred to as being maintained in a file system.

Figure 2:
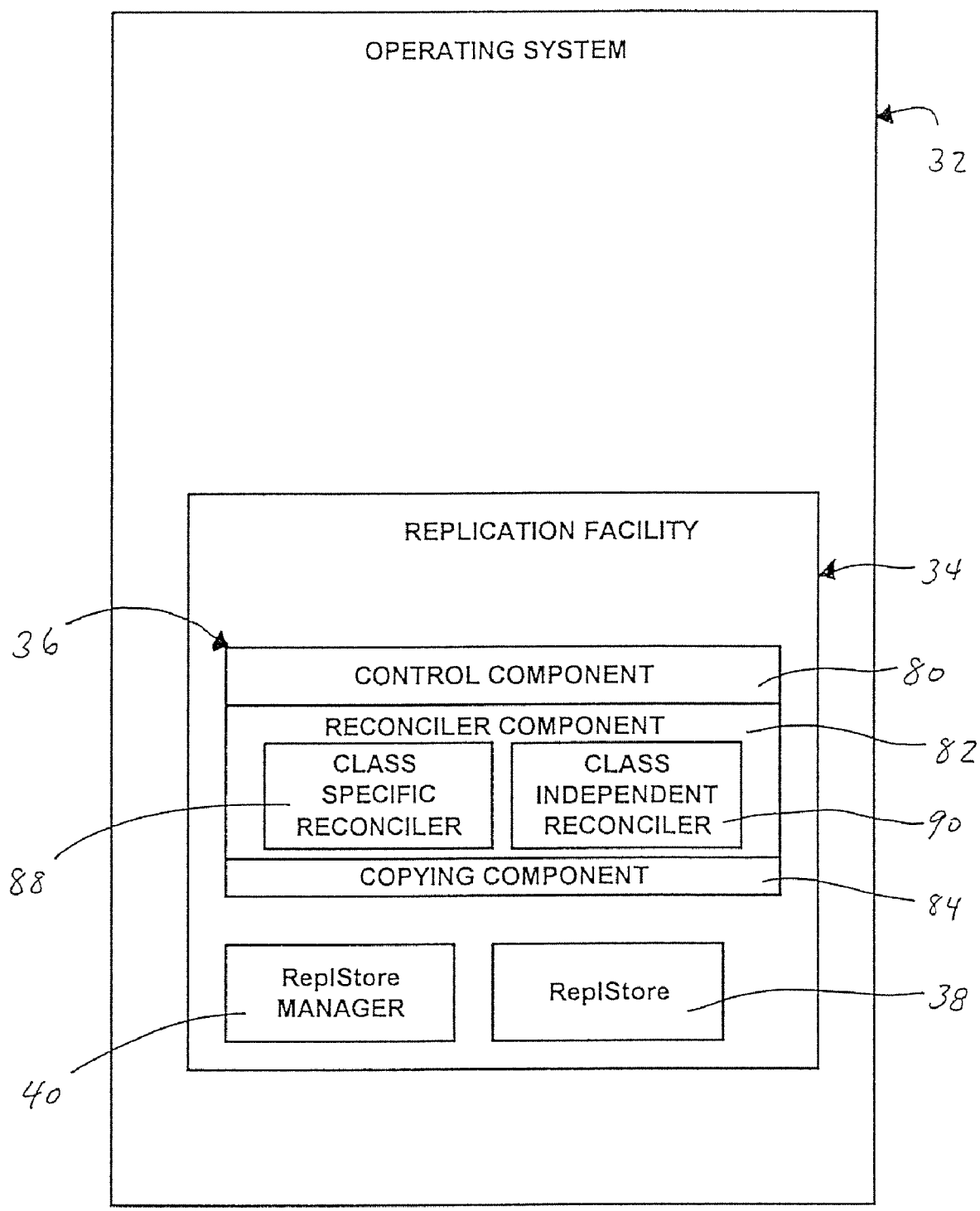
FIG. 2 is a block diagram illustrating the details of the replication facility contained within the distributed operating system shown in FIG. 1.

In keeping with one aspect of the invention, as best shown in FIG. 2 the distributed operating system 32 of the workstations includes a replication facility 34 for replicating data structures throughout the system 20. Although virtually any type of data structure including files and file directories may be replicated by the replication facility 34, replicated data structures will hereinafter ordinarily be referred to as objects, both for purposes of simplicity and because the replication facility 34 is particularly suitable for object-oriented environments. As described in more detail below, the preferred replication facility 34 includes a reconciler 36 which applies the differencing information to change the namespace and/or content of a local object (on a given one of the workstations) to reflect changes made to a remote object (on another of the workstations). Such replication and reconciliation are performed on a pair-wise basis and in one direction, and enables multiple copies of objects to be replicated and reconciled across the distributed system 20. As used herein, the term "replication" should be considered as referring to both the replication and reconciliation of objects, where appropriate.

Figure 3:
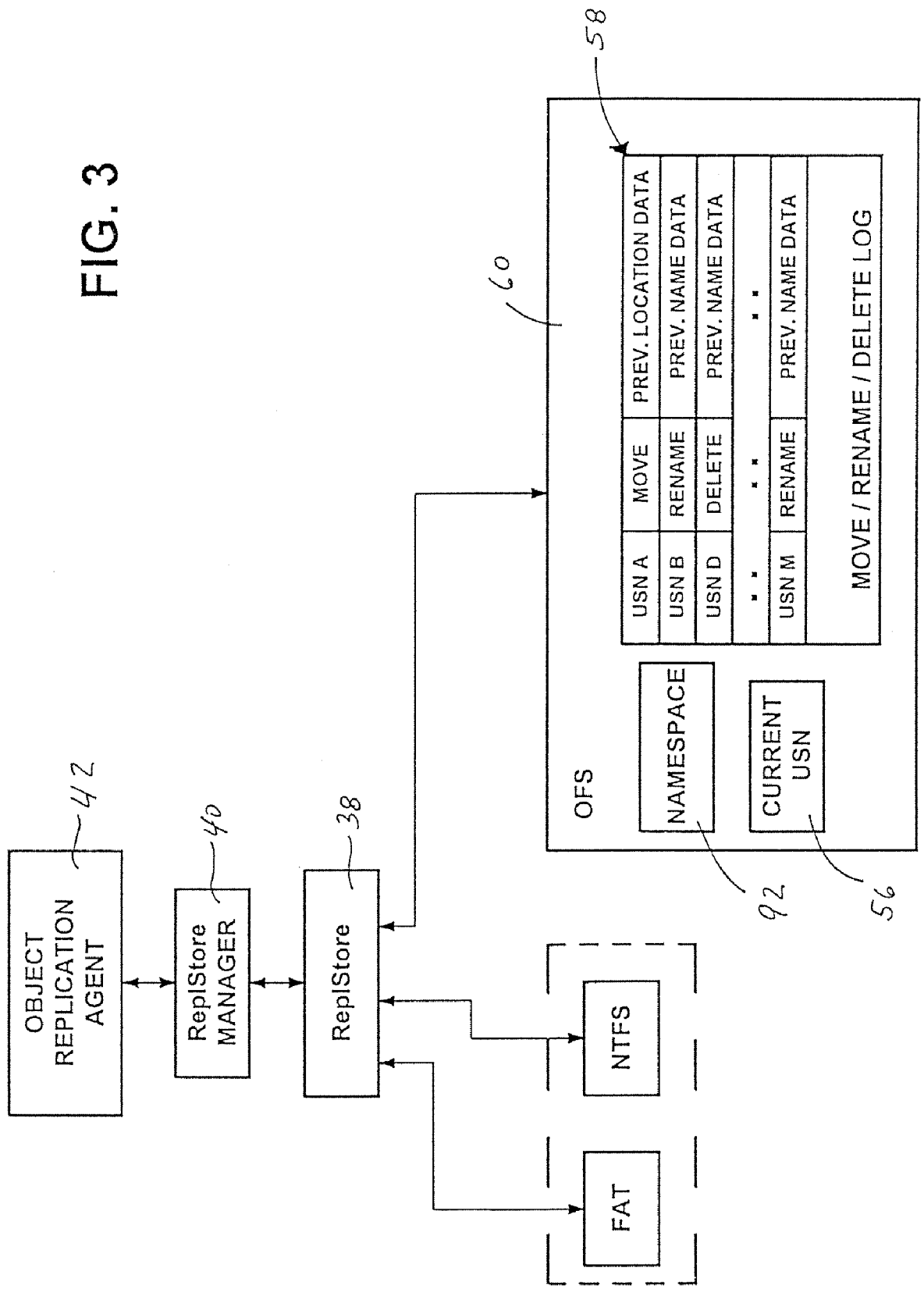
FIG. 3 is a block diagram representing the general architecture and functional components of the replication facility suitable for use with the present invention.

As shown in FIG. 3, in order to replicate objects among the replicas, which may exist on potentially different file systems, the distributed operating system 32 provides a replication engine comprising a standardized group of interfaces, known as ReplStore 38 (replicated object store). Clients call a ReplStore manager 40 which loads the appropriate ReplStore interfaces 38 according to the underlying file system. The ReplStore manager 40 also regulates access to the ReplStore interfaces 38. Both the ReplStore manager 40 and the ReplStore interfaces 38 are preferably provided in one or more Dynamic Link Libraries (DLLs), but may be provided in other ways, such as via drivers.

Using the ReplStore interfaces 38 thus provides the replication facility with access to the objects to be replicated regardless of the underlying file system. The ReplStore interfaces 38 specify signatures (such as parameters) so that the code for implementing the appropriate replication function or functions may be executed. The code that implements the function is ordinarily provided by objects or alternatively by other known implementations. In an object oriented system, the objects that provide the code comply with the signature specified in the interface, and are referred to as objects which "support" the interface. For example, an object store which stores objects in an object set may be configured to support the ReplStore interfaces 38 so that the objects of that object set may be replicated throughout the system.

Figure 4:
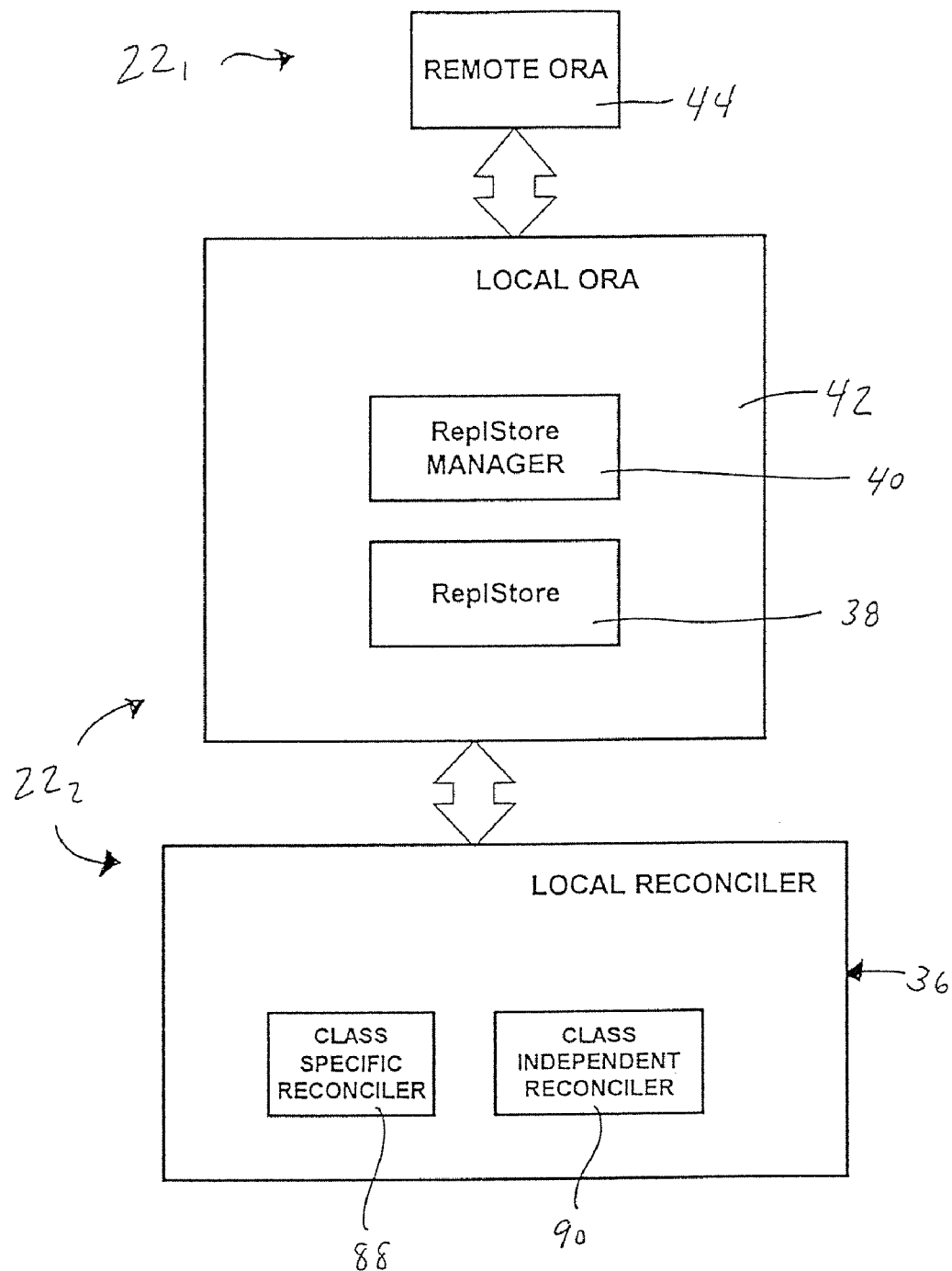
FIG. 4 is a block diagram representing how replication information is exchanged between a remote source and a local destination.

As shown in FIG. 4, each workstation 22 in the distributed system having a replica includes a local object replicator agent (ORA) 42, which can interface with one or more remote ORAs 44 on the other workstations. The local ORA 42 is a replicator service that provides automatic support for replication. The local ORA 42 loads its ReplStore manager Dynamic Link Library (DLL) 40, which in turn loads the ReplStore interface 38 as previously described. Considered from the perspective of a local workstation such as the workstation $22_2$, the local ORA 42 is responsible for communicating with a remote ORA 44 to facilitate the replication of changed objects. The local ORA 42 may be configured as remote procedural call (RPC) to service the replication requests of remote clients. Alternatively, other appropriate synchronous or asynchronous transport mechanisms may be utilized for replication, such as electronic mail, file transfer or direct network connections.

To reconcile the local object set with a remote object set, the local ORA 42 contacts the remote ORA 44 and provides information via a cursor 50 (FIG. 5) to the remote ORA 44 indicating the point (e.g., in time or any other monotonically increasing indicator of file system activity) from which replication is desired. The remote ORA returns changed object information to the local ORA 42 along with an updated cursor having information therein indicative of what point the source is at (e.g., an updated time stamp) with respect to the returned replication information. This updated replication point is stored at the destination $22_2$ in the cursor 50 for that source $22_1$, for use during the next replication cycle. Once the change information is present locally, the local ORA 42 invokes both the default and class specific reconcilers 88 and 90 to update its objects so as to be consistent with those of the remote replica which have changed since the point (e.g., time) identified in the cursor SQ.

According to one aspect of the invention, because it is generally inefficient to transfer the entire object each time replication is desired, if an object is properly configured, the replication facility 34 of the present invention ordinarily attempts to communicate only the differencing information, i.e., changes made to an object rather than the changed object itself, whenever possible. This concept is referred to as incremental replication. Of course, the facility 34 may be arranged to transfer the entire object when it determines that the size of the object makes it more efficient to do so than to transfer and apply the differencing information.

In the situation where the object file system (OFS) is employed at a given workstation, to communicate the differencing information, the replication facility 34 according to the present invention utilizes information maintained in the OFS to optimize replication. By way of background, when OFS diskspace is initially formatted, an update sequence number (USN) is set to some floor value, (e.g., zero) in the OFS for that diskspace. After every create, modify, rename, delete or move operation, the USN is monotonically-adjusted, i.e., increased for that disk volume. The OFS also maintains a move/rename/delete log that tracks changes to the name of an object. Unlike time (which can be modified and reset), USNs are only advanced. Therefore, it is preferable to utilize the USN for the cursor rather than a time stamp whenever the source node employs the OFS.

Figure 5:
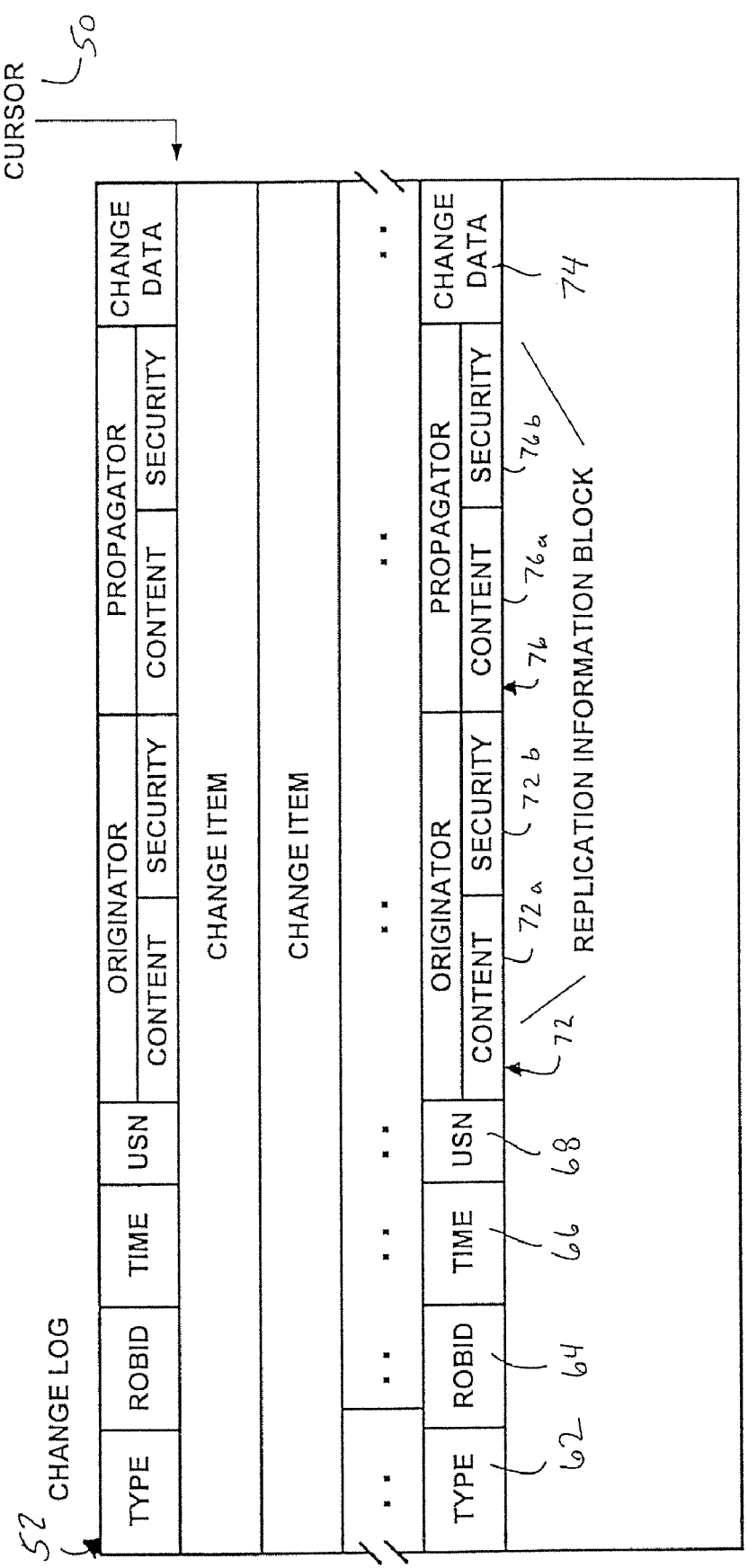
FIG. 5 is a block diagram representing an area of memory within a workstation of FIG. 1 wherein information is logged corresponding to changes made to objects.
Figure 6:
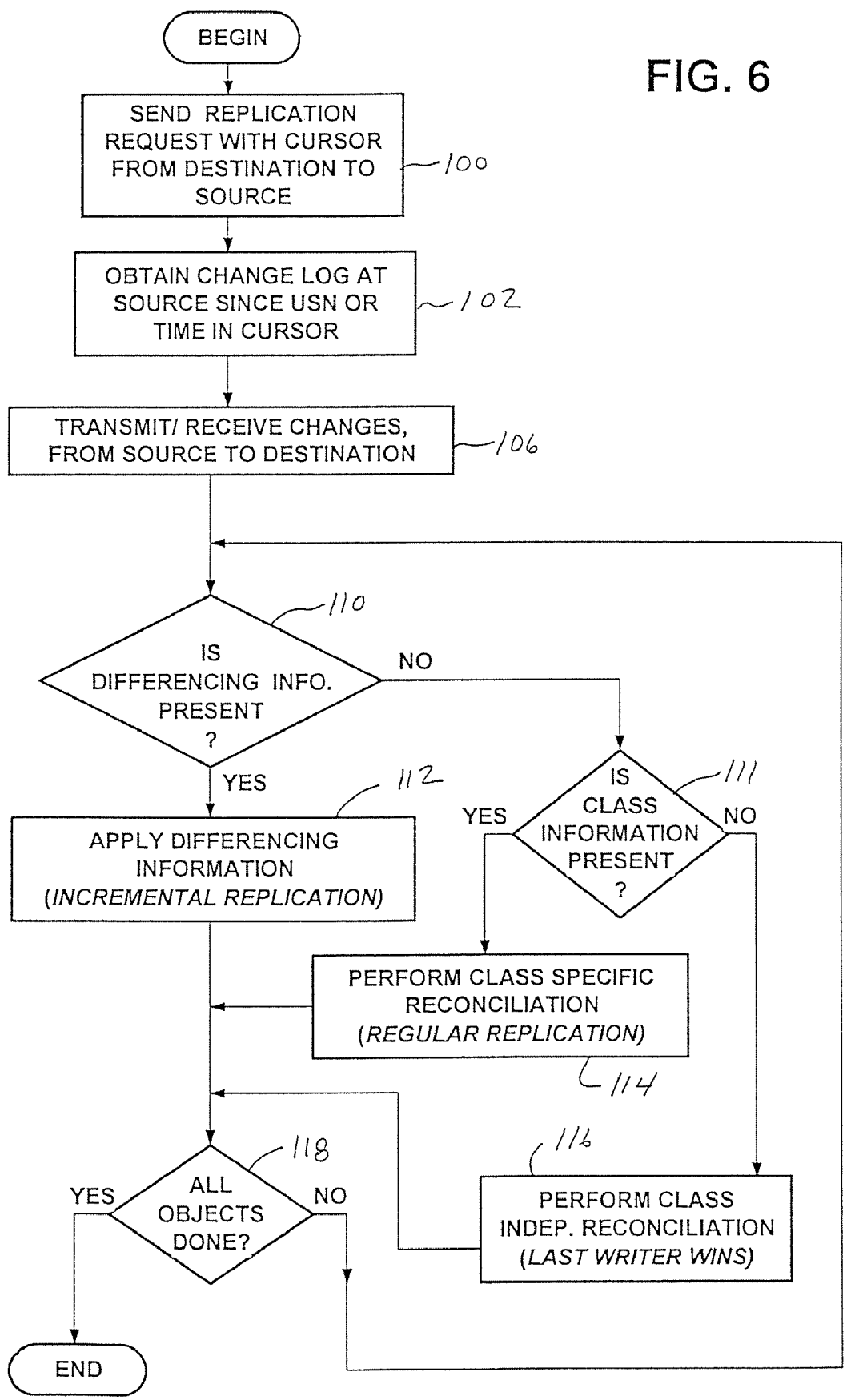
FIG. 6 is a flow diagram illustrating the steps taken when replicating and reconciling an object.

In operation, as shown at step 100 of the flow diagram of FIG. 6, when a destination (e.g., workstation $22_2$) requests replication via its ORA to a connected source (e.g., workstation $22_1$), it sends the source a cursor 50 (FIG. 5). The cursor 50 identifies from what point it last received replication information from that source, that is, the cursor 50 includes the USN and/or a time stamp (or whatever monotonic pointer the ReplStore uses to track file system activity) that was previously provided to it by the source $22_1$ during the last replication. Thus, the destination $22_2$ is essentially asking the source for all changes to objects it has had since the last cursor. The cursor 50 is relative to the source $22_1$, so that even if a time stamp rather than a USN or the like is used, any time difference between the source $22_1$ and the destination $22_2$ is immaterial.

At step 102 the source $22_1$ obtains a list of changes (including differencing information) in change log 52 and returns the list to the destination $22_2$ when feasible. The individual change items $54_1$-$54_n$ in the list 52 can either be logged as they are made to objects at the source, or dynamically rebuilt from stored information. For example, if the OFS is employed, the change log 52 can be dynamically rebuilt from the USN entries 56 and the move/rename/delete log 58 in the OFS diskspace 60 (FIG. 3). Regardless of how the list 52 is obtained, as shown in FIG. 5 each changed item $54_1$-$54_n$ returned to the destination includes a type field 62 indicative of whether an object has undergone a create, modify, rename, delete or move operation, along with a serialized replication object identifier (ROBID) in field 64 that identifies which object has changed. A time stamp and the USN (if OFS) or equivalent pointer(s) corresponding to that change are provided in fields 66 and 68, respectively. Also included is a replication information block (RIB) 70.

The RIB 70 is used for propagation dampening, i.e., to determine if a change needs to be propagated to a particular node so that changes are only propagated once to each replica node in the system. To this end, the RIB 70 comprises 1) an originator field 72 that indicates, which node in the distributed system of replicas originated the change, and 2) a propagator field 76 indicative of which replica in the distributed system propagated the change to the source $22_1$. The originator field 72 will be the same as the propagator field 76 when the resource in which a change was originated was the one that propagated it to the source $22_1$. To minimize network traffic, the source $22_1$ reviews the change log and filters out change items 54 that were originated or propagated by the requesting destination $22_2$ before transmission to the destination $22_2$. However, because the content and the access rights on an object (security) can be separately changed and propagated, the RIB includes both content and security components, and treats each type of change separately with regard to propagation dampening. Thus, for example, if a security change is made at replica A for a given object while a content change is made at replica B for that same object, the respective changes will be propagated to the other replica and not filtered out, regardless of which direction was propagated first.

The change log 52 also includes a change data field 74 for transferring the difference information of MODIFY change types should the object class support differencing. If the object supports differencing, the source side ORA service fills in this data field with differencing information provided by the object. Significantly, the objects themselves can be appropriately configured to define the content of the change data field 74 independent of any prior agreements with the replication facility 34. Thus, objects created by third parties can essentially log and later apply the differencing information according to their own definitions.

When the change log 52 is received from the source $22_1$ (step 106), the ORA of the destination $22_2$ invokes the appropriate reconcilers 88 or 90 to make its objects consistent with those at the source $22_1$. If the object is configured to apply differencing information, the class specific reconciler 88 applies the differencing information in data field 74 to each object identified in ROBID field 64 according to information contained in the object itself. This may or may not include information such as class information, but in any event enables the object itself to determine what it means to be consistent with its counterpart objects at other replicas. In essence, an object created by a third party capable of functioning with differencing information thus determines its own level of consistency with its counterpart replicas.

As shown in FIG. 2, the reconciler 36 contains a control component 80, a reconciler component 82, and a copying component 84 for duplicating objects. The control component 80 determines when reconciliation occurs, for example, upon a request to reconcile or after a certain amount of time. The control component 80 also provides security and determines who can request reconciliation.

The replication facility 34 of the present invention is capable of performing regular replication with objects that are not configured to perform incremental replication as described herein. For example, if an object at a remote source does not provide its changes, but instead is arranged to perform class-specific reconciliation, the replication facility 34 handles the class-specific reconciliation on its objects, as described in U.S. patent application Ser. No. 08/181,704. Thus, at steps 110-111 the control component 80 also determines the type of reconciliation for each object based upon what information was received from the destination.

The reconciler component 82 provides the functions that perform the various types of reconciliation as determined by the control component 80. Thus, the reconciler component 82 includes a class specific reconciler 88 capable of performing on-line class specific reconciliation (step 114) if the object provides a class. Optionally, if supported by an object's class code, a class specific reconciler may be provided that is capable of generating and consuming differences. Thus, in the preferred embodiment, at least one class specific reconciler will apply received differencing information to the objects according to instructions in the object (step 112), when differencing information is received from the source $22_1$. Finally, a class independent reconciler 90 is also available when no class is specified, and functions according to a "last writer wins" rule to ensure identical content of objects (step 116).

When all objects in the log 52 have been reconciled as determined at step 118, the replication and reconciliation for that destination and source are completed.

By way of example of how an object is reconciled when the object has been configured to operate with differencing information, when a replicated object's content is changed at the source, a MODIFY operation is included in the cursor 50 as a change item. The type field 62 for the renamed object contains a value indicating that the object identified in ROBID field 64 was modified at the time stamp and USN (both relative to the source) that are present in fields 66 and 68, respectively. The originator content field 72a and propagator content field 76a in this instance both contain the identity of the source, since in the present example the object was renamed at that source. After the source side ORA service has received the MODIFY change from its corresponding ReplStore, the ORA service asks the object to generate differencing information (if the object supports differencing), which it then stores in the change data field 74.

When the differencing information is received, the destination $22_2$ requests reconciliation via the control component 80, which recognizes the differencing information. The control component 80 invokes the class specific reconciler component 88 to apply the changes. The class specific reconciler, which supports differencing, evaluates the object for instructions on how to reconcile it with the provided differencing information. In this example, the class specific reconciler 88 would typically modify the content of the destination object so that the objects are consistent.

As can be appreciated, extraction, transmission and application of the differencing information are distinct steps which the replication service can individually optimize. For example, extraction (at the source) and application (at the destination) can be scheduled so as to not conflict with other activities or heavy system usage. Transmission can include compressing and/or encrypting the differencing information if desired, regardless of whether the objects themselves support compression or encryption. As previously described, transmission can utilize any suitable transport mechanism, either synchronous or asynchronous.

An advantage to the replication facility described herein is that the objects define the content of their own differencing information, and are not required to have knowledge of the replication service. Enabling objects to call such replication services provides for significant extensibility. Further, in the Object Linking and Embedding (OLE) model of the present invention, it can be dynamically determined whether an object supports the differencing interface. Consequently, as new classes of objects are added to existing systems, the replication service can immediately determine how replication can be optimized for that object.

Turning to another aspect of the invention, there is provided a mechanism within the above-described replication facility 34 that enables a changed object to propagate itself to its replicas without waiting for a destination to initiate a replication cycle. This type of replication will be referred to hereinafter as "urgent replication." Urgent replication preferably functions on a push model, in which the source pushes a changed object to one or more destinations, although it is feasible to construct a pull model wherein a destination regularly polls a source seeking urgent changes. Alternatively, other types of replication of urgent objects may be accomplished. For example, the source may notify a destination that it has urgent changes available, whereby the destination will pull those changes when ready, after some time interval. The time interval may be zero.

Figure 7:
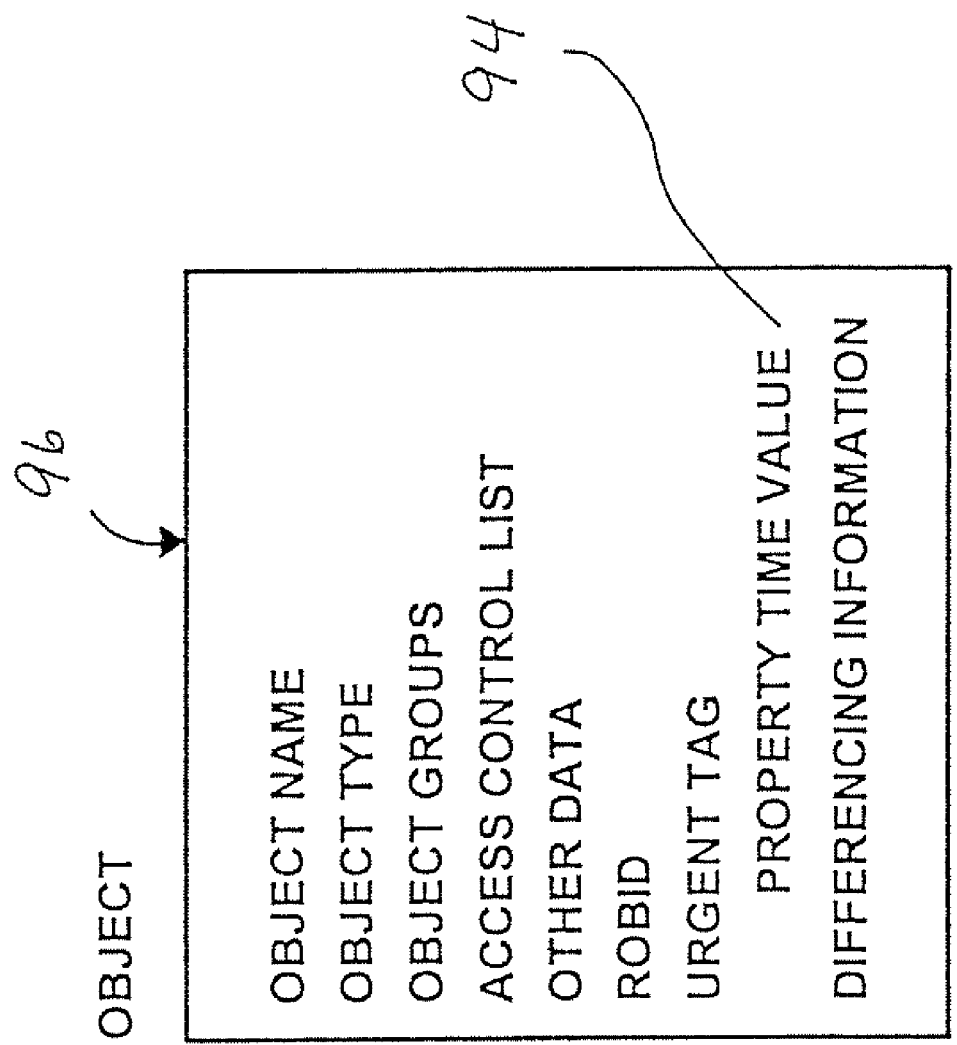
FIG. 7 is a representation of an object which is deemed to be an urgent object.
Figure 8:
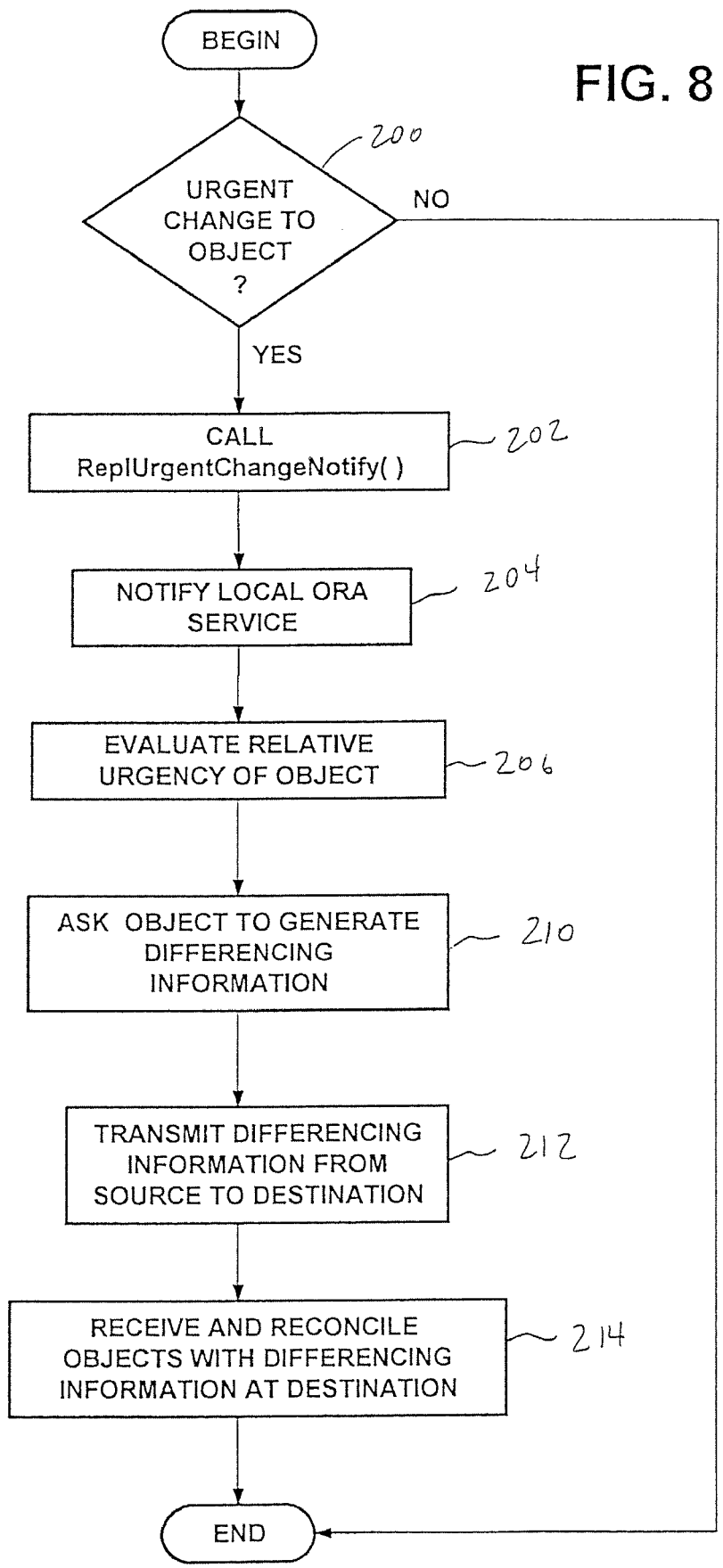
FIG. 8 is a flow diagram illustrating the steps taken when replicating an urgent object.

To accomplish urgent replication, certain objects are configured to recognize changes to themselves that are defined to be urgent, as shown in step 200 of FIG. 8. By way of example, whenever the access rights or password of a user object is changed, the object can be arranged to report the—change to the replication facility 34 using a function named ReplUrgentChangeNotify( ), shown in FIG. 8 as step 202. Calling ReplUrgentChangeNotify( ) notifies the local ORA (via an RPC at step 204) that an object has an urgent change. Upon notification, the ORA promptly derives the urgent difference and propagates it as required. If the ORA service is not running, this function tags the object with a property time value at a field therein, as shown in field 94 in sample object 96 of FIG. 7. When the ORA service restarts, the timestamp is evaluated by the ORA service and if relatively recent, the urgent difference is derived and propagated as previously described.

At step 206, the replication facility 34 of the present invention evaluates the relative urgency of each object that has identified itself as being urgent, as determined according to policies set by the system administrator. For example, security-type changes may be considered urgent enough to propagate every three minutes, while group changes may be propagated every ten minutes. The differencing information is generated almost immediately after notification, but only a single difference is derived regardless of how many edges are present over which the difference will be replicated.

Thus, unlike incremental replication, at step 210 the ORA service, promptly, but synchronously, asks the object having an urgent change to generate its differencing information. Once the difference is obtained, a copy of it is delivered on each appropriate edge in the topology at step 212.

At step 214, the destination receives the differencing information and reconciles the objects as desired, preferably with relatively high priority. Communication between the source and destination takes place in the previously described manner over any suitable transport mechanism, however for security purposes synchronous replication is highly desirable.

So that all replicas in the distributed system 20 receive the changes, the destination can be arranged to forward these urgent changes in a similarly urgent manner to other replicas that are not connected to the originating source.

As can be seen from the foregoing detailed description, there is provided a system and method for efficiently replicating data objects in a distributed system of replicas. The replication facility maintains incremental differencing information and replicates the differencing information upon a request for replication. The replication facility further enables the expedited replication of certain data objects deemed urgent, wherein a data structure may initiate its propagation to other replicas in the system. The replication facility replicates objects in an object-oriented environment, without the need for the replication objects to have knowledge of the replication topology or the operating environment. The replication facility is independent of the type of file systems used to store those objects, and is extensible.

We claim:

1. A method for reconciling changes between one or more files stored on a first computer system and a replica of the one or more files stored on a second computer system, the method comprising:

maintaining an update sequence number indicative of a number of changes to the one or more files;

detecting a change to the one or more files and, in response to the detected change, increasing the update sequence number to an increased value;

comparing the increased value of the update sequence number to information indicative of a most recent reconciliation between the one or more files and the replica of the one or more files;

in response to the comparing, providing an indication of a type associated with the change; and modifying the replica of the one or more files.

2. A method for replicating data between a first computer system and a second computer system in a distributed computing environment, the method comprising:

storing one or more files on the first computer system;

storing a replica of the one or more files on the second computer system;

maintaining an update sequence number indicative of a number of changes to the one or more files;

detecting a change to the one or more files and, in response to the detected change, increasing the update sequence number to an increased value; and transmitting the increased value of the update sequence number to the second computer in association with information describing the change and an indication of a type associated with the change.

\* \* \* \* \*